(12) United States Patent
Mackin

(10) Patent No.: US 11,353,121 B2
(45) Date of Patent: Jun. 7, 2022

(54) COMPRESSOR VALVES FOR AIRCRAFT

(71) Applicant: The Boeing Company, Chicago, IL (US)

(72) Inventor: Steve G. Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 137 days.

(21) Appl. No.: 16/665,895

(22) Filed: Oct. 28, 2019

(65) Prior Publication Data
US 2021/0123534 A1    Apr. 29, 2021

(51) Int. Cl.
| | |
|---|---|
| *B64D 13/02* | (2006.01) |
| *F16K 3/26* | (2006.01) |
| *B64D 13/06* | (2006.01) |
| *F16K 17/02* | (2006.01) |

(52) U.S. Cl.
CPC ............ *F16K 3/26* (2013.01); *B64D 13/02* (2013.01); *B64D 13/06* (2013.01); *F16K 17/02* (2013.01); *B64D 2013/064* (2013.01); *B64D 2013/0607* (2013.01); *B64D 2013/0644* (2013.01)

(58) Field of Classification Search
CPC ............... B64D 13/02; B64D 13/06; B64D 2013/0618; B64D 2013/064; B64D 2013/0644; F16K 3/26; F16K 3/262
See application file for complete search history.

(56) References Cited

U.S. PATENT DOCUMENTS

| | | | | |
|---|---|---|---|---|
| 3,685,536 | A * | 8/1972 | Bake | F16K 49/00 137/338 |
| 5,409,351 | A * | 4/1995 | Geist | F01D 17/148 137/625.31 |
| 6,039,065 | A * | 3/2000 | Gagliardo | F16K 3/26 137/3 |
| 9,234,707 | B2 | 1/2016 | Mackin et al. | |
| 2015/0226089 | A1* | 8/2015 | Roy | F01D 17/148 415/68 |
| 2017/0114910 | A1* | 4/2017 | Ottow | F04D 27/023 |
| 2021/0123539 | A1* | 4/2021 | Bristiel | F16K 5/0442 |

* cited by examiner

*Primary Examiner* — Paul J Gray
(74) *Attorney, Agent, or Firm* — Hanley, Flight & Zimmerman, LLC

(57) ABSTRACT

Compressor valves for aircraft are described herein. An example valve for a compressor includes a first end plate, a second end plate, and a first sleeve valve disposed between the first and second end plates. The first the first sleeve valve is operable between a closed state and an open state. The example valve also includes a second sleeve valve disposed between the first and second end plates and within the first sleeve valve such that a plenum is formed between the first end plate, the second end plate, the first sleeve valve, and the second sleeve valve. The plenum is to receive outlet air from an outlet of the compressor. A passageway is formed through a center of the valve to be fluidly coupled to an inlet of the compressor. The second sleeve valve is operable between a closed state and an open state.

9 Claims, 15 Drawing Sheets

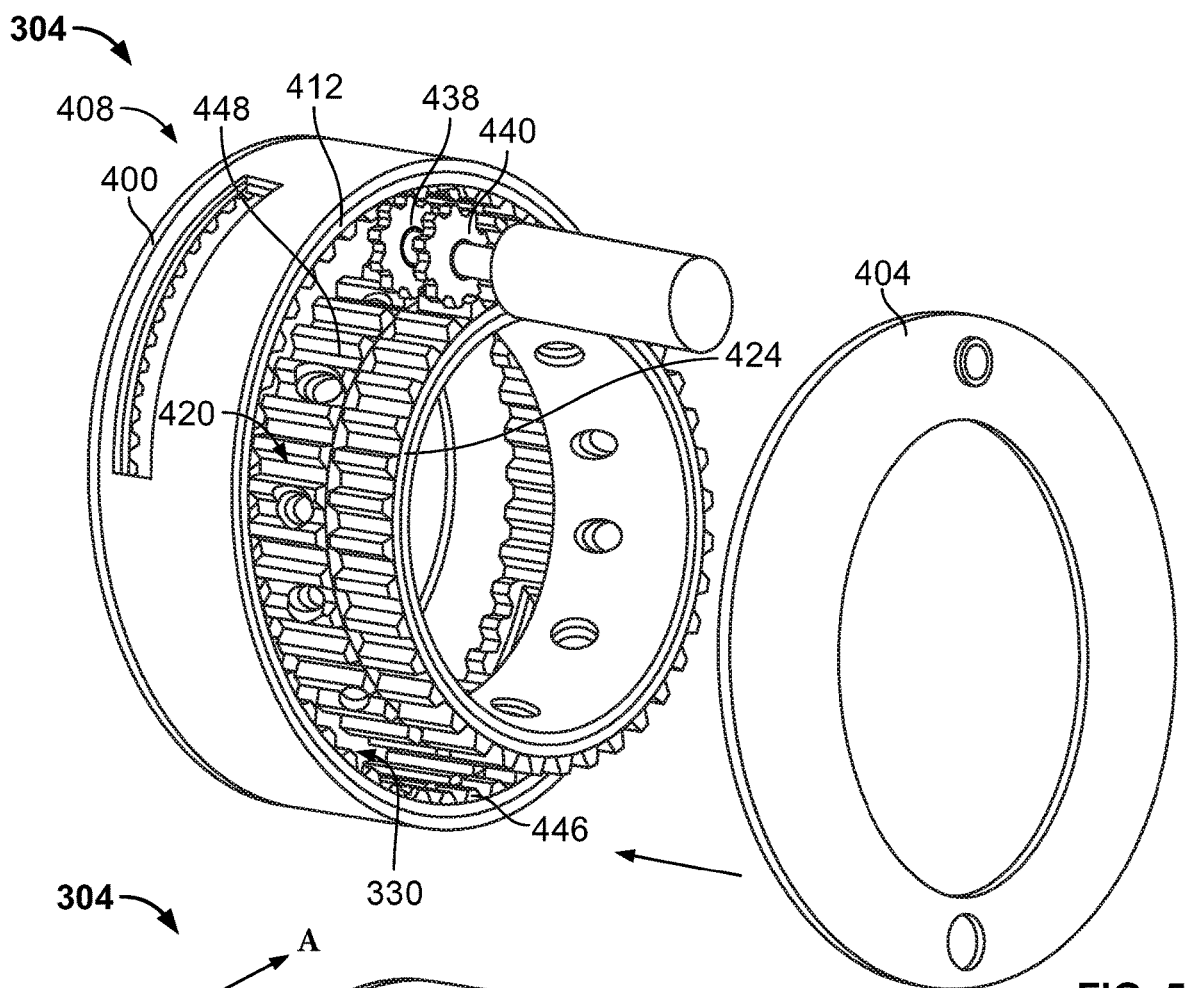
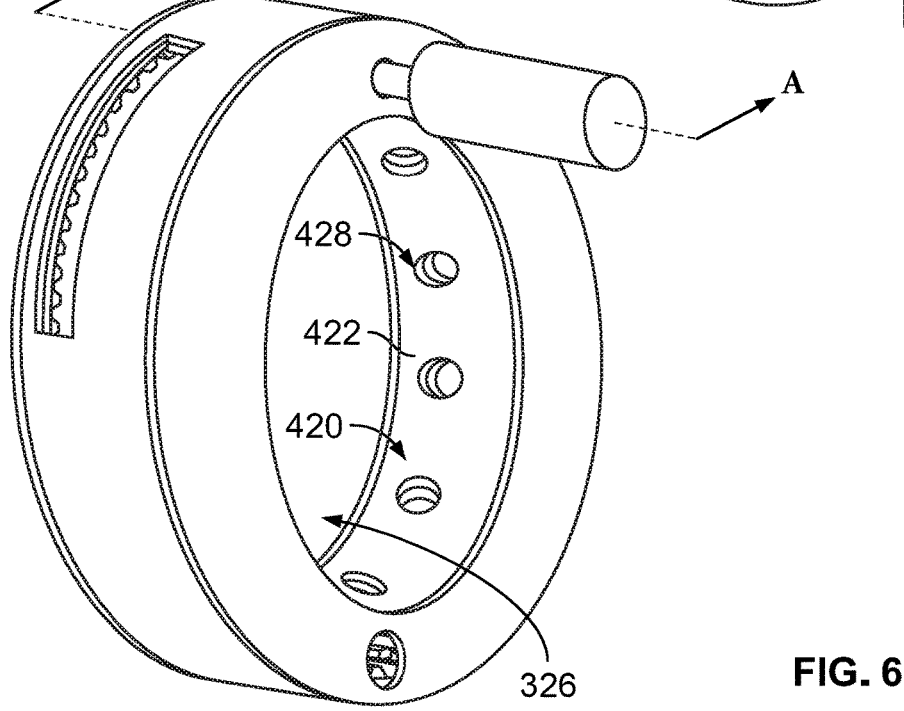
FIG. 5
FIG. 6

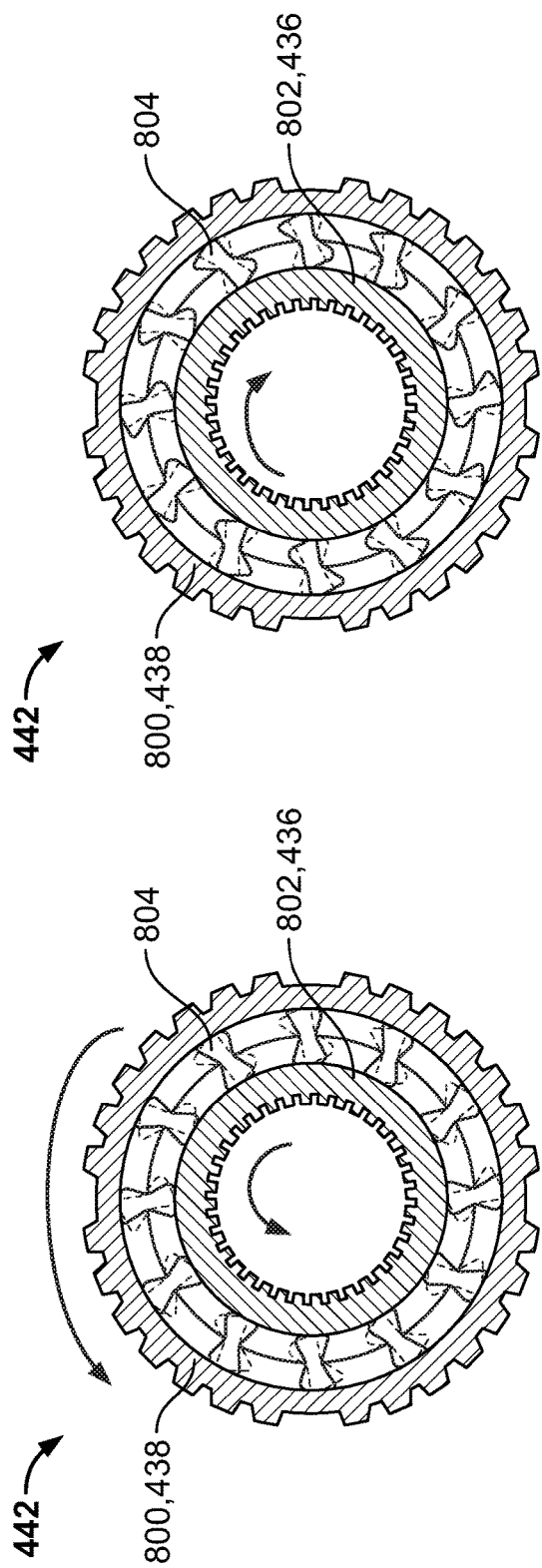
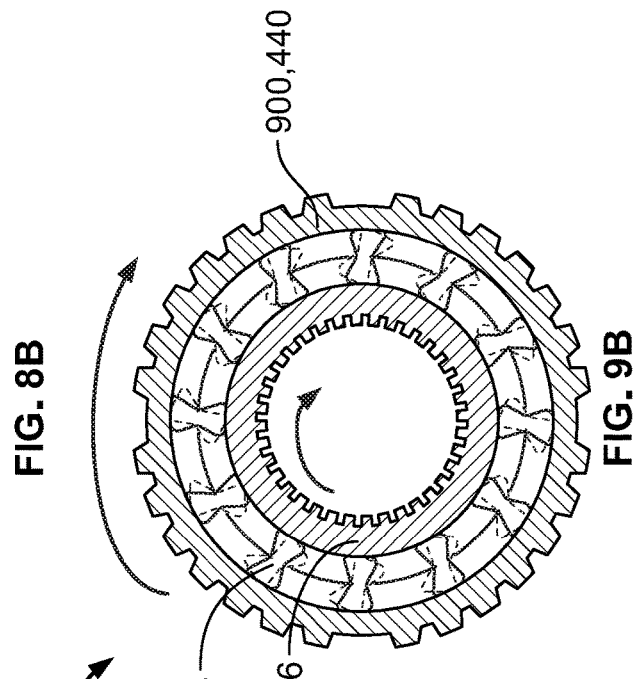
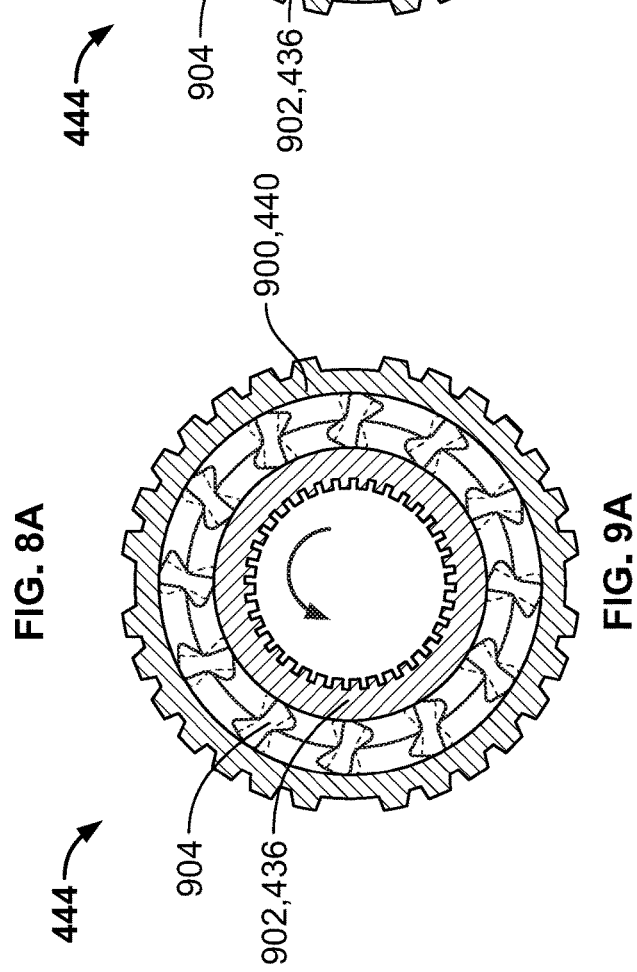
FIG. 8A  FIG. 8B  FIG. 9A  FIG. 9B

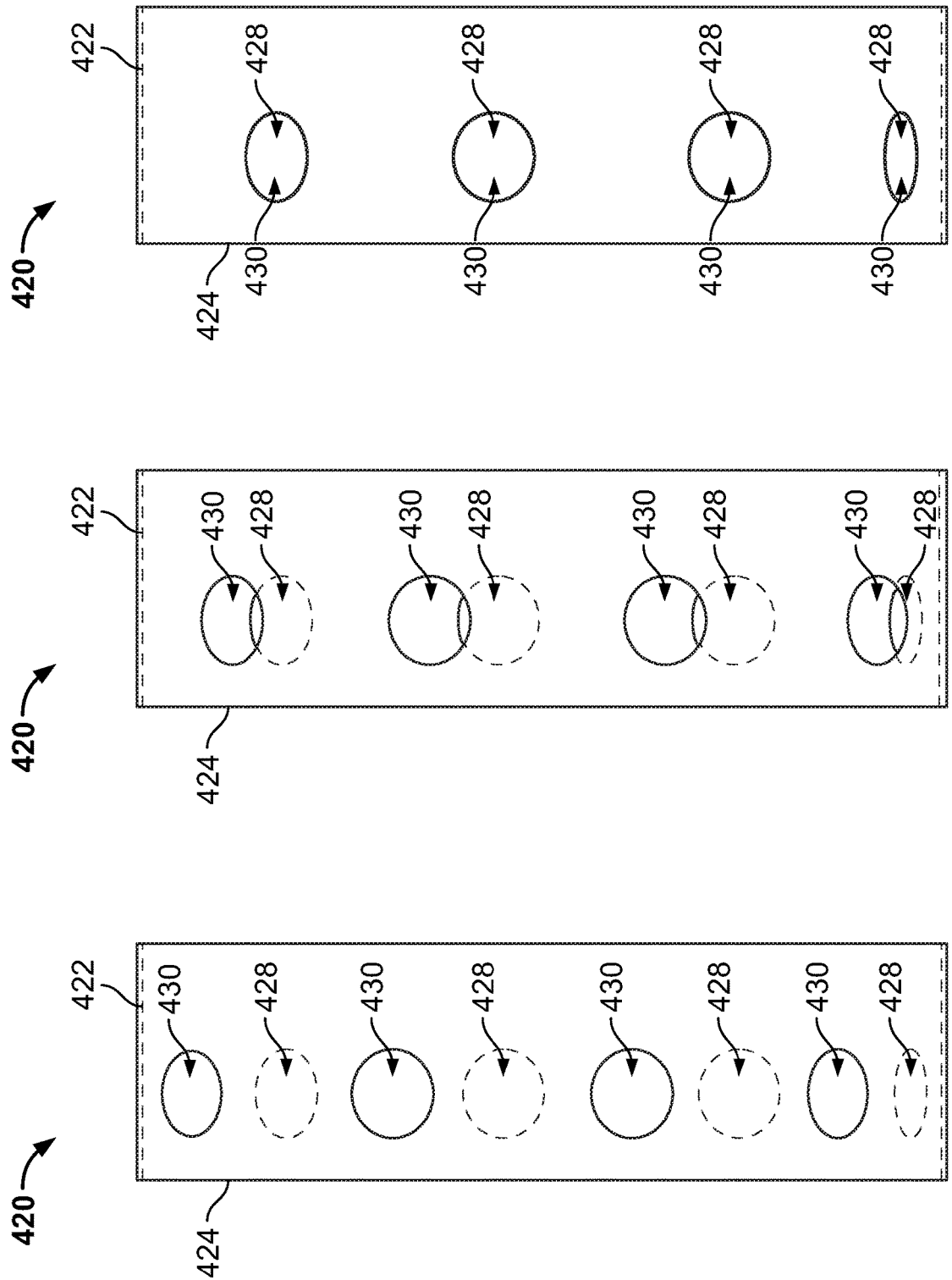

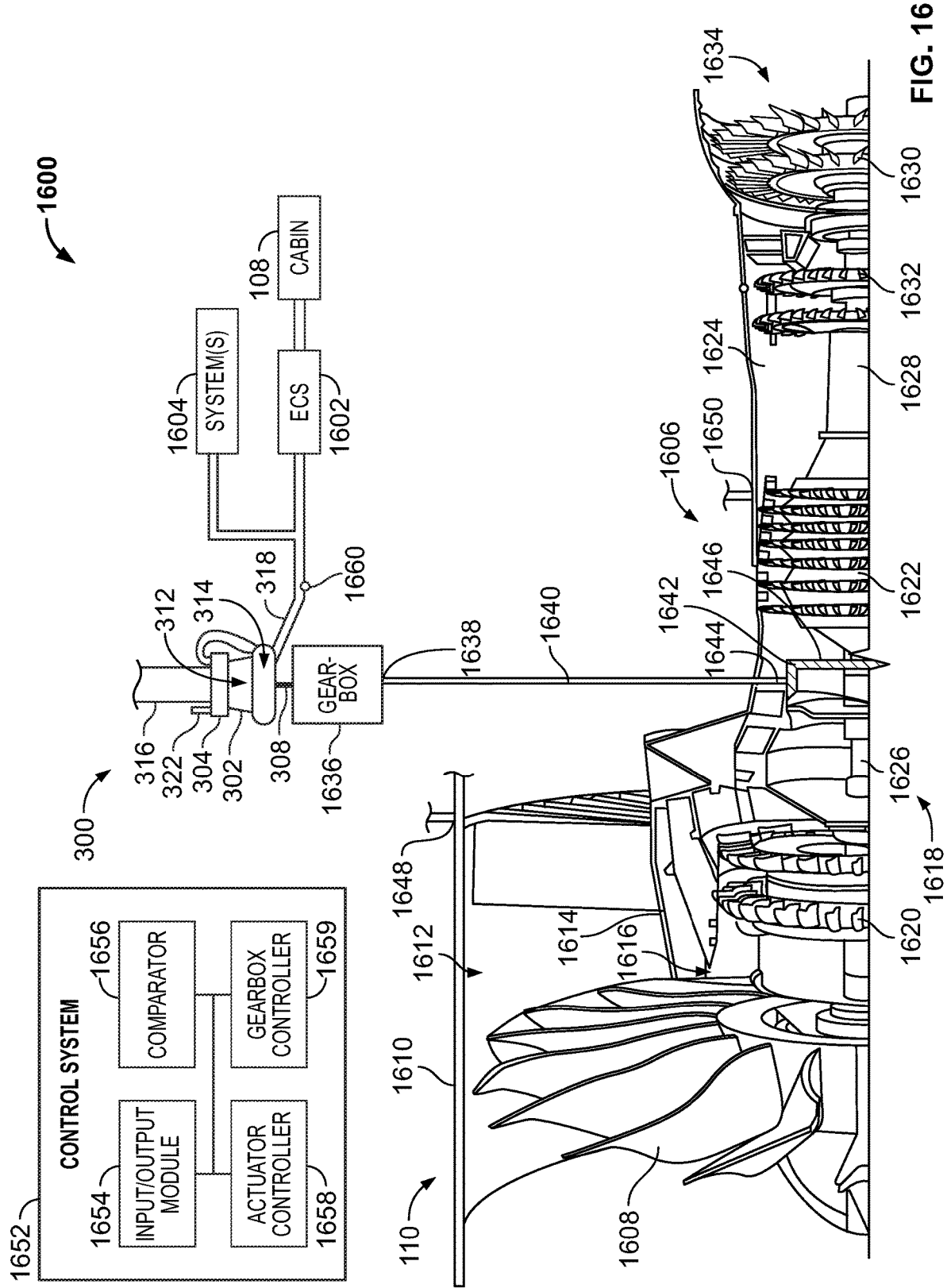

COMPRESSOR VALVES FOR AIRCRAFT

FIELD OF THE DISCLOSURE

This disclosure relates generally to aircraft, and, more particularly, to compressor valves for aircraft.

BACKGROUND

Known commercial aircraft include one or more systems that utilize pressurized air. For example, many known commercial aircraft include an environmental control system (ECS) that conditions (e.g., regulates the temperature and pressure of) cabin supply air that is provided to a cabin of the aircraft. The pressurized air for these systems is produced by a shaft-driven compressor of a compressor system. The compressor system includes two separate valves to perform surge and add-heat functions. In particular, because the compressor is constantly being driven, the compressor may over-produce pressurized air when the demand is low. Therefore, a surge valve is used to vent compressor outlet air to the atmosphere to prevent compressor surging. Additionally, in some instances, it may be desired to increase the temperature of the compressor outlet air. Therefore, an add-heat valve is used to circulate some of the warm compressor outlet air back to the compressor inlet, which increases the compressor outlet air.

However, this dual-valve arrangement requires a relatively large amount of space. Such space is typically limited in the nacelle of an engine where the compressor system is located. The surge valve and the add-heat valve are typically implemented as butterfly valves, which are relatively large and expensive components. Also, the surge valve and the add-heat valve are operated by separate actuators, which also consume space. Additionally, space is needed for surge and recirculation fluid lines.

Further, the add-heat air is often directed into a plenum around an inlet fluid line. The plenum is sized for maximum recirculation. If the flow of the add-heat air is low, the plenum may not be choked and the air may not be uniformly distributed into the compressor inlet. The add-heat valve can be choked, but it is difficult to have enough pressure left over to choke the slot.

Additionally, this known compressor system does not swirl air into the compressor inlet to enhance compressor stability by adjusting the angle of attack on the impeller. Therefore, this type of system typically requires inlet guide vanes, a unison ring, and an actuator to enhance stability. Thus, in some instances, three actuators are utilized in the system.

SUMMARY

Disclosed herein is an example valve for a compressor. The valve includes a first end plate, a second end plate, and a first sleeve valve disposed between the first and second end plates. The first the first sleeve valve is operable between a closed state and an open state. The example valve also includes a second sleeve valve disposed between the first and second end plates and within the first sleeve valve such that a plenum is formed between the first end plate, the second end plate, the first sleeve valve, and the second sleeve valve. The plenum is to receive outlet air from an outlet of the compressor. A passageway is formed through a center of the valve to be fluidly coupled to an inlet of the compressor. The second sleeve valve is operable between a closed state and an open state. When the first sleeve valve is in the open state, the outlet air in the plenum is vented to atmosphere to reduce or prevent compressor surging, and, when the second sleeve valve is in the open state, the outlet air in the plenum is provided to the passageway for recirculation through the compressor.

An example compressor system disclosed herein includes a compressor having a compressor inlet and a compressor outlet, an inlet fluid line to supply inlet air to the compressor inlet, and a valve including a first sleeve valve and a second sleeve valve disposed within. A plenum defined between the first and second sleeve valves. The valve coupled between the compressor inlet and the inlet fluid line. The valve defines a passageway for the inlet air to flow through the valve to the compressor inlet. The compressor system also includes an auxiliary fluid line fluidly coupling the compressor outlet and the plenum to provide outlet air from the compressor outlet to the plenum. The first sleeve valve is operable to vent the outlet air from the plenum to atmosphere, and the second sleeve valve is operable to provide the outlet air from the plenum into the passageway to be provided to the compressor inlet.

A system to provide pressurized air to a system of an aircraft that receives pressurized air is disclosed herein. The system includes a gearbox driven by an engine of the aircraft and a compressor operatively coupled to and driven by the gearbox. The compressor has a compressor inlet and a compressor outlet. The system also includes a valve including a first sleeve valve and a second sleeve valve disposed within the first sleeve valve and coaxial relative to the first sleeve valve, an inlet fluid line to supply inlet air to the compressor inlet, an outlet fluid line to fluidly couple the compressor outlet to the system of the aircraft that receives pressurized air, and an auxiliary fluid line fluidly coupling the compressor outlet and the valve to supply outlet air from the compressor outlet to the valve. The first sleeve valve is to vent outlet air from the compressor outlet to reduce or prevent compressor surging, and the second sleeve valve is to recirculate the outlet air from the compressor outlet back into the compressor inlet.

BRIEF DESCRIPTION OF THE DRAWINGS

FIG. 5 is a partially assembled perspective view of the example valve of FIG. 2.

FIG. 6 is an assembled perspective view of the example valve of FIG. 2.

FIGS. 8A and 8B are cross-sectional views of a first example clutch that may be implemented in connection with the example valve of FIG. 2.

FIGS. 9A and 9B are cross-sectional views of a second example clutch that may be implemented in connection with the valve of FIG. 2.

FIGS. 13A-13C are side views of the second example sleeve valve of FIG. 11 in a closed state, a partially opened state, and a fully opened state, respectively.

FIG. 16 is a schematic illustration of an example system to produce pressurized air implemented in connection with the example aircraft of FIG. 1 and utilizing the example compressor system of FIG. 2.

Figure 1:
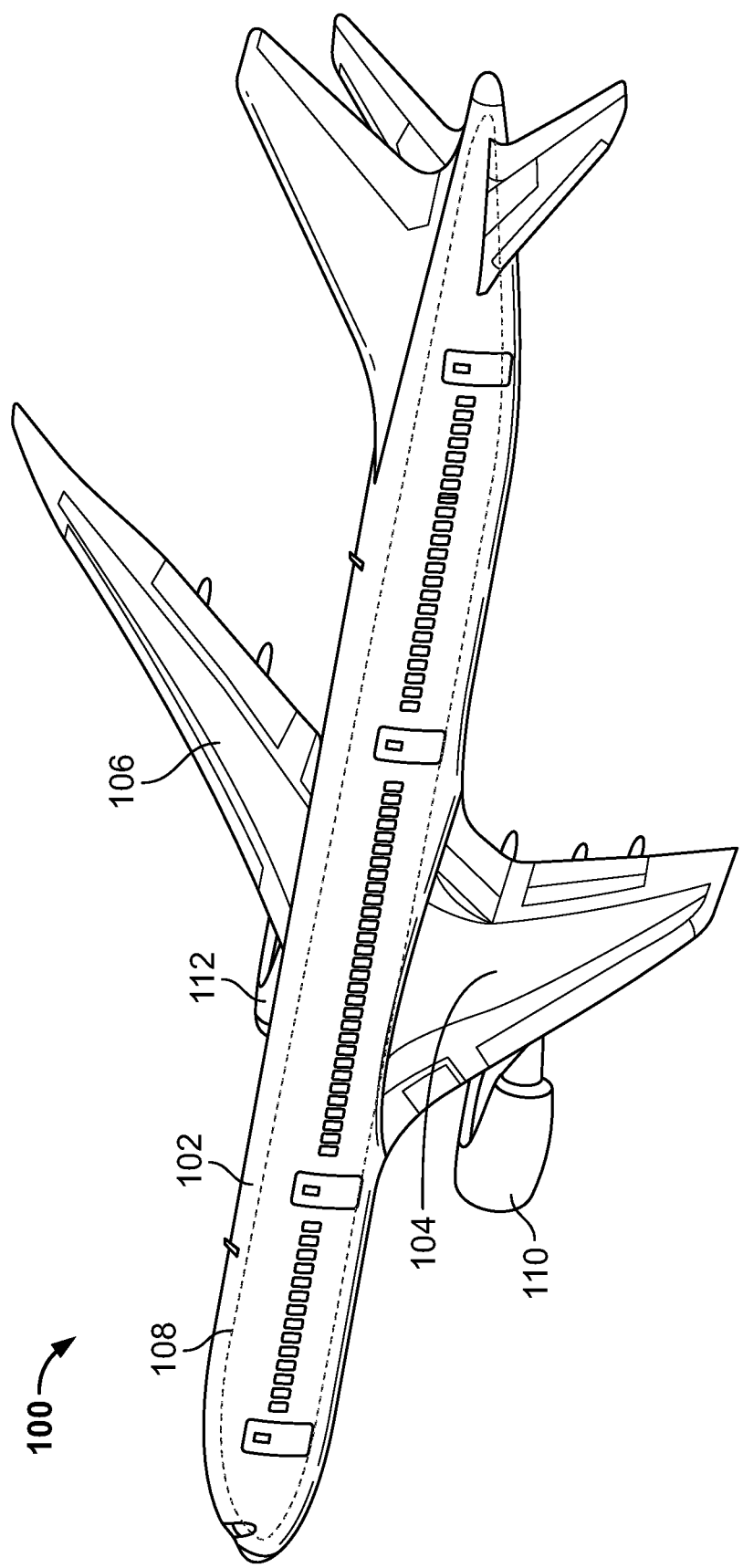
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example valves for compressors and example compressor systems that utilize such valves are disclosed herein.

Example compressor systems disclosed herein include a shaft-driven compressor. The compressor includes a housing having a compressor inlet and a compressor outlet and an impeller disposed in the housing. The impeller may be driven by a motor or engine, for example. The compressor system includes an inlet fluid line to supply inlet air to the compressor inlet. The compressor increases a pressure of the inlet air from the compressor inlet to the compressor outlet. The compressor system also includes an outlet fluid line to route the pressurized outlet air (sometimes referred to as discharged air) from the compressor outlet to one or more systems that utilize pressurized air. For example, the example compressor system may be used in an aircraft to produce pressurized air for an environmental control system (ECS) (sometimes referred to as a cabin air system) and/or one or more other systems that utilize and/or operate on pressurized air.

The example compressor systems disclosed include an example valve to perform both surge bleed and add-heat functions for the compressor. In particular, in some instances, it is desired to relieve pressure from the compressor outlet to reduce or prevent compressor surging. For example, the pressure of the outlet air may be too high for the downstream sources. This excessive pressure can cause the compressor to surge. In such an instance, the valve can be operated to vent the outlet air to the atmosphere to reduce or prevent compressor surging. Further, in some instances, it is desired to increase a temperature of the outlet air at the compressor outlet. In such an instance, the valve can operate to direct some of the warm/hot outlet air back into the compressor inlet, which increases the temperature of the inlet air and, thus, further increases the temperature of the outlet air.

Traditional compressor systems utilize two separate valves, one for surge bleed and one for add-heat. These known valves are relatively large and are actuated via independent actuators. This sort of arrangement requires significant space for the valves, fluid lines, and actuators.

The example valves disclosed herein are dual-sleeve valves that are smaller and more compact than valves in known systems. As such, the example valves disclosed herein consume less space or volume, which is extremely valuable, especially in tight spaces such as an engine housing (e.g., a nacelle) of an aircraft. Further, the example valves disclosed herein may be operated using a single actuator. Therefore, the number of actuators can be reduced.

An example valve disclosed herein may be coupled to or otherwise disposed upstream from the compressor inlet. A passageway is defined through a center of the valve, such that air from the inlet fluid line flows freely through the center of the valve to the compressor inlet. In other words, the valve is disposed around (e.g., concentric with, coaxial with) a passageway that provides air to the compressor inlet.

The valve includes a first end plate, a second end plate spaced apart from the first end plate, a first sleeve valve disposed between the first and second end plates, and a second sleeve valve disposed between the first and second end plates and within the first sleeve valve. The first and second sleeve valves are concentric and coaxial. A plenum (e.g., a chamber) is formed between the first end plate, the second end plate, the first sleeve valve, and the second sleeve valve. An auxiliary fluid line fluidly couples the compressor outlet and the plenum of the valve to provide the outlet air from the compressor to the plenum. The first sleeve valve operates as a surge valve to provide surge bleed functions and the second sleeve valve operates as an add-heat valve to provide add-heat or recirculation functions.

In some examples, the first example sleeve valve includes an outer fixed sleeve with a first opening and an outer rotatable sleeve with a second opening. The outer rotatable sleeve is disposed within the outer fixed sleeve and is rotatable along an inner surface of the outer fixed sleeve. The first sleeve valve is operable between a closed state and an open state. In the closed state, the outer rotatable sleeve is rotated to a position in which the first and second openings are not overlapping. In such a position, the outlet air in the plenum of the valve is blocked from venting to atmosphere. In the open state, the outer rotatable sleeve is rotated to a position such that the first and second openings are at least partially overlapping. In such a position, the outlet air in the plenum is vented through the first and second openings to the atmosphere, which reduces or prevents surging at the compressor outlet.

In some examples, the second sleeve valve includes an inner fixed sleeve with a first plurality of openings and an inner rotatable sleeve with a second plurality of openings. The inner rotatable sleeve is disposed outside of the inner fixed sleeve and is rotatable around an outer surface of the inner fixed sleeve. The inner fixed sleeve defines the passageway through which the inlet air flows. The second sleeve valve is operable between a closed state and an open state. In the closed state, the inner rotatable sleeve is rotated to a position in which the first and second plurality of openings are not overlapping. As such, the outlet air in the plenum is prevented from flowing into the passageway and to the compressor inlet. In the open state, the inner rotatable sleeve is rotated to a position in which the first and second plurality of openings are at least partially overlapping. In such a position, the outlet air in the plenum flows through the first and second plurality of openings and into the passageway in the center of the valve and therefore to the compressor inlet, thereby recirculating air from the compressor outlet back to the compressor inlet.

This concentric and coaxial arrangement of the first and second sleeve valves results in a relatively compact valve for providing both surge bleed and add-heat operations. Thus, the example valves disclosed herein reduce the total space or volume needed for surge bleed and add-heat valves. When the example valve is coupled to the compressor, the first and second sleeve valves are coaxial with the compressor inlet.

In some examples, the valve includes a single actuator to operate both the first and second sleeve valves, which also reduces the total space occupied by the valve. For example, the inner surface of the outer rotatable sleeve may include first gear teeth, and the outer surface of the inner rotatable sleeve may include second gear teeth. The actuator includes a drive shaft that is rotated in a first direction or a second direction opposite the first direction. A first gear is coupled to the drive shaft via a first clutch and a second gear is coupled to the drive shaft via a second clutch. The first gear is engaged with the gear teeth on the outer rotatable sleeve but not with the gear teeth on the inner rotatable sleeve. The second gear is engaged with the gear teeth on the inner rotatable sleeve but not with the gear teeth on the outer rotatable sleeve.

The first and second clutches are arranged such that when the actuator rotates the drive shaft in the first direction, the drive shaft also rotates the first gear in the first direction but slips relative to the second gear such that the second gear does not rotate. Therefore, when the actuator rotates the drive shaft in the first direction, the outer rotatable sleeve is rotated, but the inner rotatable sleeve is not rotated. As such, the actuator can control the position of the outer rotatable sleeve to open or close the first sleeve valve.

Conversely, when the actuator rotates the drive shaft in a second direction, opposite the first direction, the drive shaft rotates the second gear in the second direction but slips relative to the first gear such that the first gear does not rotate. As such, the actuator can control the position of the inner rotatable sleeve to open or close the second sleeve valve. In this manner, a single actuator can be used to operate both the first and second sleeve valves.

While many of the example valves and compressor systems disclosed herein are described in connection with aircraft systems, it is understood that the example valves and compressor systems disclosed herein can be used in connection with any system or device utilizing a compressor.

FIG. 1 illustrates an example aircraft 100 in which the examples disclosed herein can be implemented. The aircraft 100 includes a fuselage 102, a first wing 104 coupled to the fuselage 102, and a second wing 106 coupled to the fuselage 102. The fuselage 102 defines a cabin 108 (shown in dashed lines) where the passengers and/or cargo are carried. In the illustrated example, the aircraft 100 includes a first engine 110 carried by the first wing 104 and a second engine 112 carried by the second wing 106. In other examples, the aircraft 100 may include only one engine or may include more than two engines. The engine(s) can be carried on the first and/or second wings 104, 106 and/or another structure on the aircraft 100 (e.g., on the tail section of the fuselage 102).

The aircraft 100 may include one or more systems to produce pressurized air for various systems of the aircraft 100, such as an ECS that pressurizes the cabin 108 and regulates the temperature of the air in the cabin 108. Disclosed herein are example valves and example compressor systems utilizing such valves that may be implemented in connection with such systems. An example of such a system to produce pressurized air for a system of an aircraft is disclosed in connection with FIG. 16.

Figure 2:
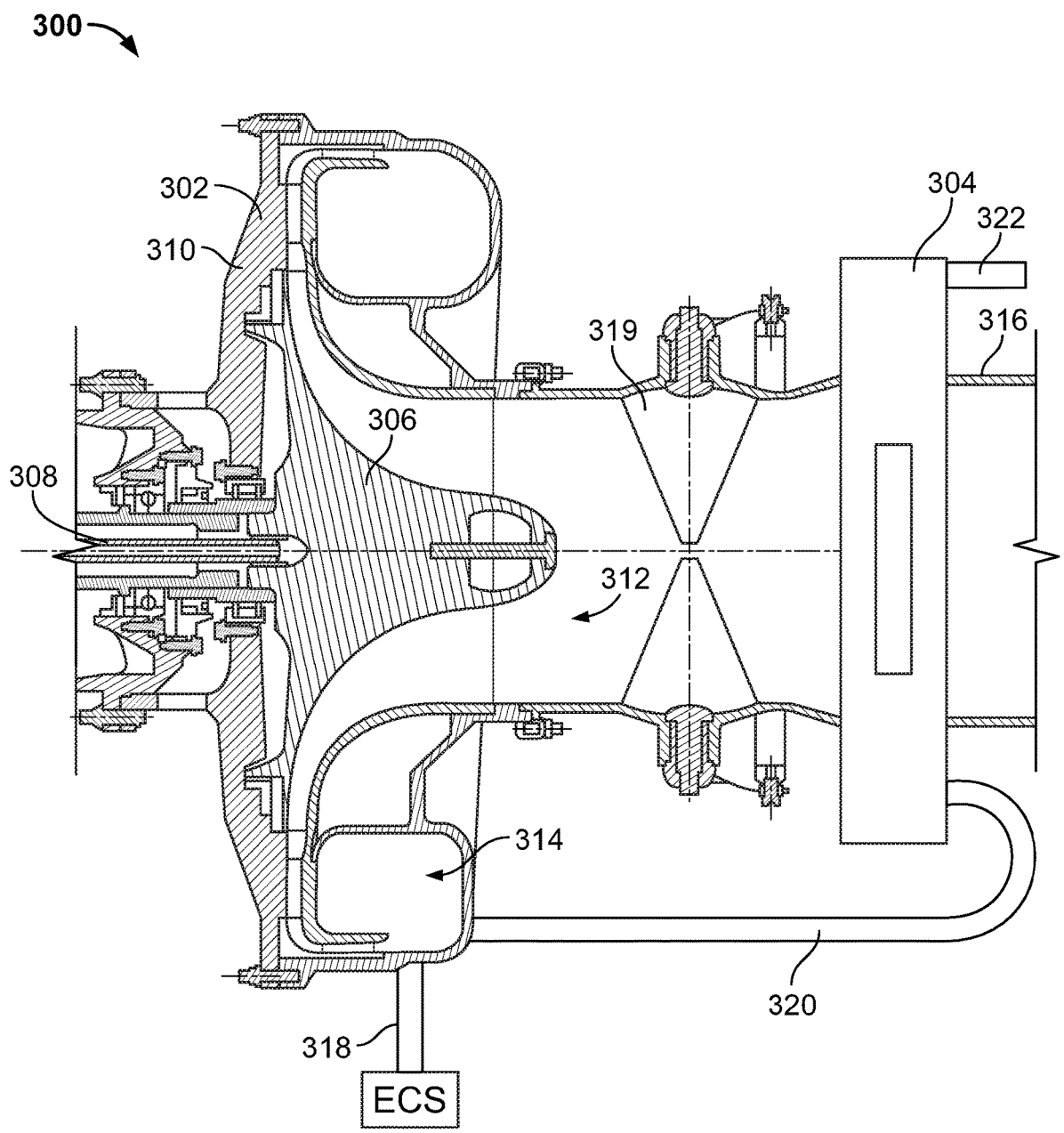
FIG. 2 is a partial cross-sectional view of an example compressor system including an example compressor and an example valve constructed in accordance with the teachings of this disclosure. The example compressor system can be implemented in connection with the example aircraft of FIG. 1.

FIG. 2 is a partial cross-sectional view of an example compressor system 300 including an example compressor 302 and an example valve 304 constructed in accordance with the teachings of this disclosure. The compressor system 300 is used to produce pressurized air for one or more systems of an aircraft that use pressurized air. For example, the compressor system 300 may be implemented in the aircraft 100 to provide pressurized air to an ECS. An example of such a system is shown in connection with FIG. 16 and discussed in further detail herein. In the illustrated example, the compressor 302 is shown as cross-sectioned but the valve 304 is not cross-sectioned.

The compressor 302 is a shaft-driven compressor. In this example, the compressor 302 is a centrifugal compressor. The compressor 302 includes an impeller 306 coupled to a drive shaft 308. The drive shaft 308 (and, thus, the impeller 306) may be driven by a gearbox that is powered by one of the engines 110, 112 of the aircraft 100 (FIG. 1). The compressor 302 includes a housing 310 having a compressor inlet 312 and a compressor outlet 314. The impeller 306 is disposed in the housing 310.

In the illustrated example, the compressor system 300 includes an inlet fluid line 316 to provide inlet air to the compressor inlet 312. The inlet air may be fan air and/or bleed air from one or both of the engines 110, 112, for example. The compressor system 300 also includes an outlet fluid line 318 to fluidly couple the compressor outlet 314 to one or more systems that utilize pressurized air, such as an ECS. When the impeller 306 is driven by the drive shaft 308, the compressor 302 increases the pressure of the inlet air from the compressor inlet 312 to the compressor outlet 314.

The compressor outlet air is then provided via the outlet fluid line 318 to the ECS and/or other systems that utilize pressurized air. In the illustrated example, the compressor system 300 includes inlet guide vanes 319 to swirl the air into the compressor inlet 312, thereby providing stability to the air flow into the compressor inlet 312. However, in other examples, inlet guide vanes may not be utilized.

In the illustrated example, the compressor system 300 includes an auxiliary fluid line 320 that fluidly couples the compressor outlet 314 and the valve 304 to provide a portion of the outlet air to the valve 304. The example valve 304 is operable to provide both surge bleed and add-heat functions. In particular, the valve 304 is operable to vent the outlet air to the atmosphere to reduce or prevent compressor surging when the pressure at the compressor outlet 314 is above a predetermined threshold pressure. Further, the valve 304 is operable to provide the outlet air back into the compressor inlet 312 for recirculation through the compressor 302 and, thus, increase the temperature of the outlet air at the compressor outlet 314. In the illustrated example, the valve 304 includes an actuator 322 (e.g., a hydraulic rotary actuator) that actuates the valve 304 to provide the surge bleed and/or add-heat functions.

In the illustrated example, the valve 304 is fluidly coupled to the compressor inlet 312, between the compressor inlet 312 and the inlet fluid line 316. As shown in further detail herein, a passageway is formed through a center of the valve 304. The inlet fluid line 316 is coupled to the valve 304 and the inlet air flows freely through the passageway of the valve 304 to the compressor inlet 312. In other words, the valve 304 is disposed around and/or otherwise forms part of a passageway that supplies the inlet air to the compressor inlet 312. The example valve 304 is smaller and more compact than having two separate valves as used in known systems. Further, the example compressor system 300 eliminates the need for a separate fluid line for surge relief. In this example, the inlet guide vanes 319 are provided between the valve 304 and the compressor inlet 312. However, in other examples, inlet guide vanes may not be utilized. Instead, the valve 304 may be coupled directly to the housing 310 at the compressor inlet 312.

Figure 3:
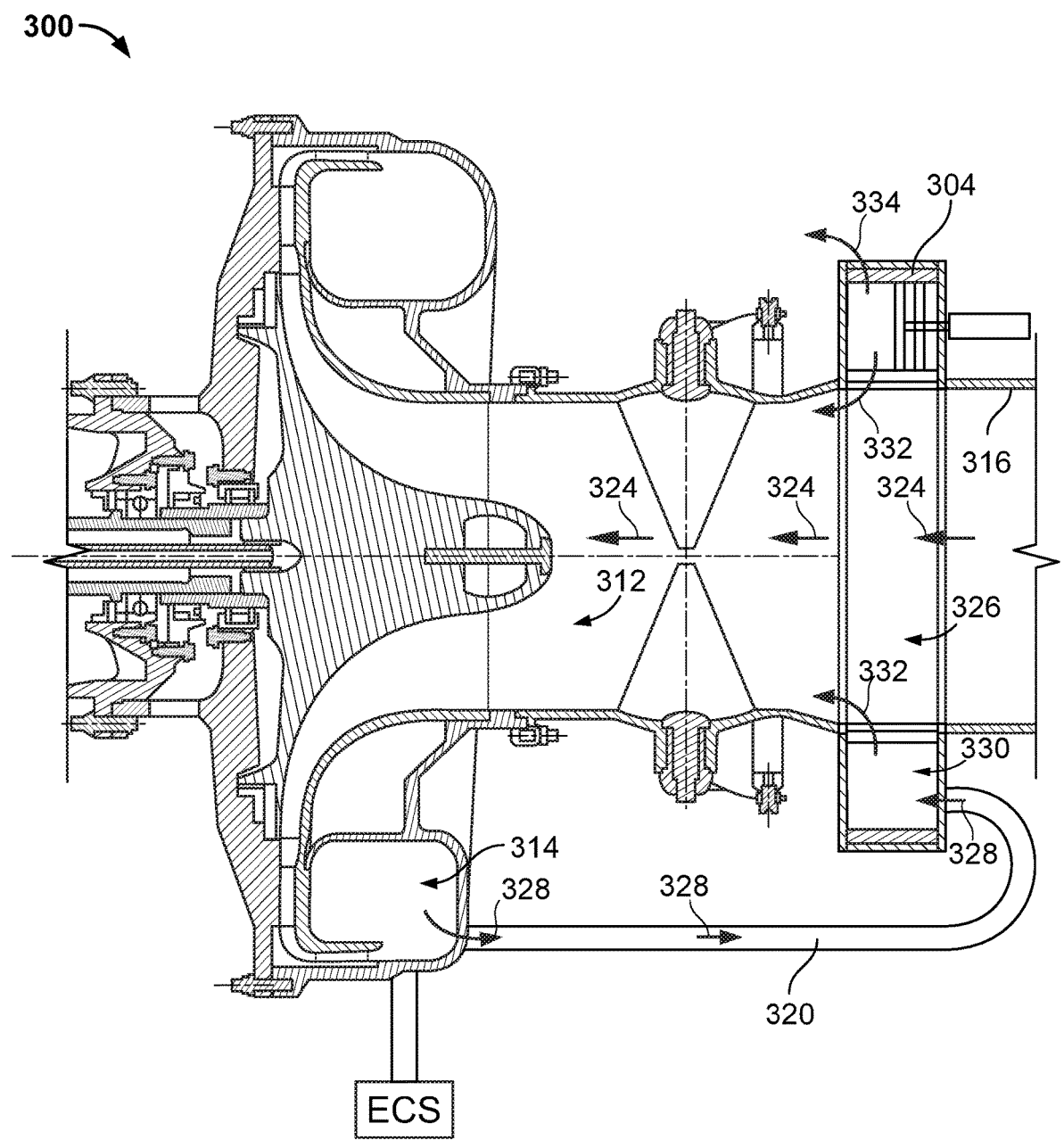
FIG. 3 is a cross-sectional view of the example compressor system of FIG. 2.

FIG. 3 is another cross-sectional view of the example compressor system 300 in which the valve 304 is also cross-sectioned. As shown in FIG. 3, during operation, inlet air (shown by arrows 324), which is provided by the fluid inlet line 316, flows through a passageway 326 in the valve 304 to the compressor inlet 312. A portion of the outlet air (shown by arrows 328) is routed by the auxiliary fluid line 320 from the compressor outlet 314 to a plenum 330 (e.g., a chamber) of the valve 304. For add-heat function, the valve 304 may be operated to direct the outlet air from the plenum 330 into the passageway 326 (shown by arrows 332), where the air mixes with the inlet air and flows back into the compressor inlet 312. For surge function, the valve 304 may be operated to vent the outlet air from the plenum 330 to atmosphere (shown by arrow 334).

Figure 4:
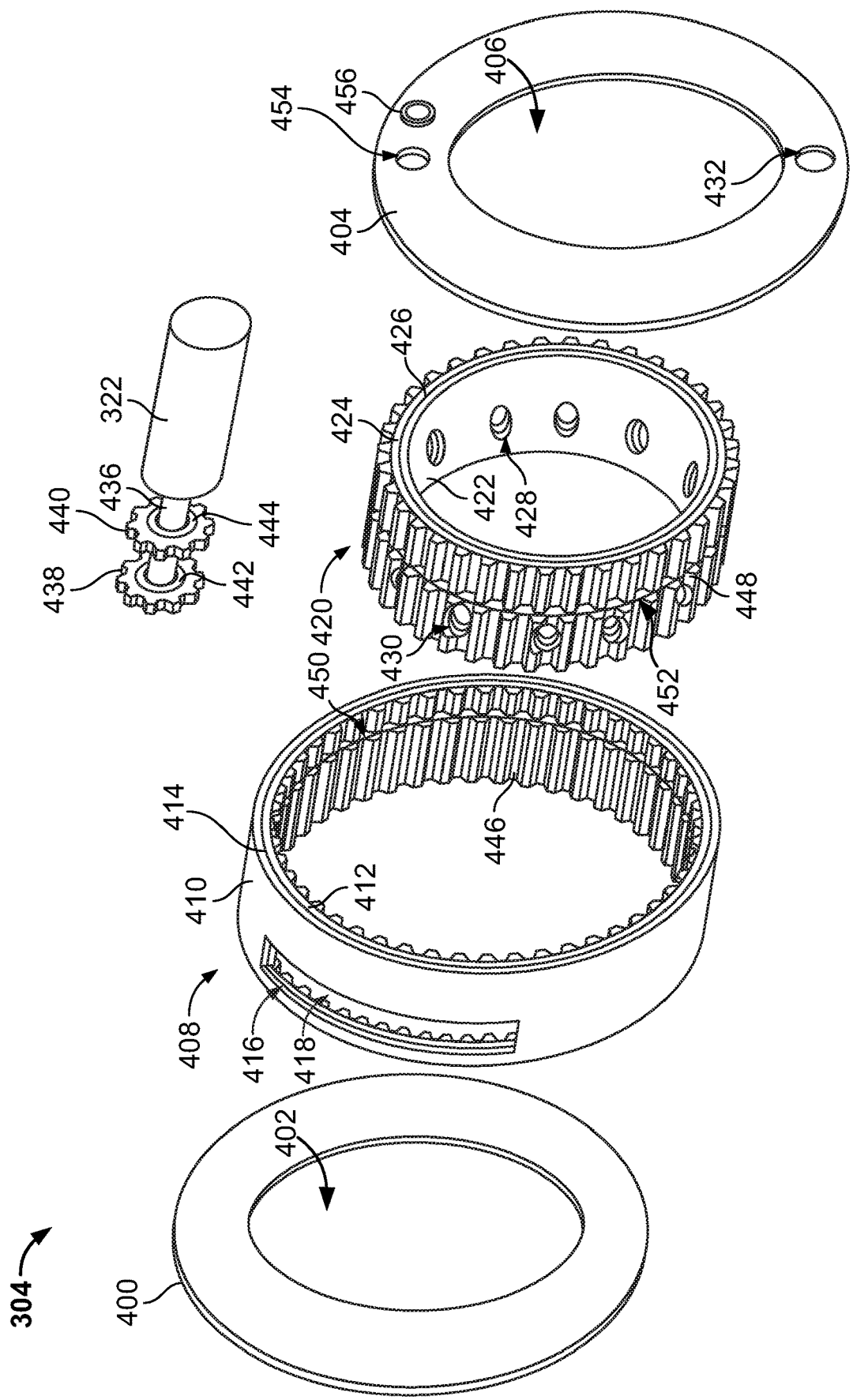
FIG. 4 is an exploded view of the example valve of FIG. 2.

FIG. 4 is an exploded view of the example valve 304. In the illustrated example, the valve 304 includes a first end plate 400 with a first opening 402 and a second end plate 404 with a second opening 406. The first and second openings 402, 406 form a portion of the passageway 326 (FIG. 3) through the valve 304. When the valve 304 is assembled, the first and second end plates 400, 404 are spaced apart from each other.

In the illustrated example, the valve 304 includes a first sleeve valve 408. The first sleeve valve 408 operates as a surge valve to reduce or prevent compressor surging. The first sleeve valve 408 includes an outer fixed sleeve 410 and an outer rotatable sleeve 412. In this example, the outer rotatable sleeve 412 is disposed within the outer fixed sleeve 410. The outer fixed sleeve 410 is fixed or stationary, while the outer rotatable sleeve 412 is rotatable relative to the outer fixed sleeve 410. The outer rotatable sleeve 412 is sealingly engaged with and slides along an inner surface 414 of the outer fixed sleeve 410 such that air cannot flow between the outer fixed sleeve 410 and the outer rotatable sleeve 412. The outer fixed sleeve 410 and the outer rotatable sleeve 412 may form a slip fit. Additionally or alternatively, one or more bearing, bushing, and/or sealing elements may be disposed between the outer fixed sleeve 410 and the outer rotatable sleeve 412 to enable the outer rotatable sleeve 412 to rotate smoothly.

The first sleeve valve 408 is operable between a closed state and an open state. In the illustrated example, the outer fixed sleeve 410 has a first opening 416, and the outer rotatable sleeve 412 has a second opening 418. In the closed state, the outer rotatable sleeve 412 is rotated to a position in which in the first and second openings 416, 418 are not overlapping. As a result, air is prevented from flowing through the outer rotatable sleeve 412 and the outer fixed sleeve 410 to the atmosphere. In the open state, the outer rotatable sleeve 412 is rotated to a position in which the first and second openings 416, 418 are at least partially overlapping, which enables air to flow through the outer rotatable sleeve 412 and the outer fixed sleeve 410 to the atmosphere. In FIG. 4, the first and second openings are 416, 418 shown as fully overlapping.

In some examples, it is advantageous to have only one opening in each of the outer fixed and rotatable sleeves 410, 412 to reduce or prevent leakage as well as direct the flow of air in a specific direction (e.g., away from sensitive components in the nacelle of the engine). However, in other examples, the outer fixed and rotatable sleeves 410, 412 may each have a plurality of openings. The openings may be spaced apart from each other around the respective sleeves. In other examples, the outer fixed sleeve 410 may have only one opening and the outer rotatable sleeve 412 may have a plurality of openings (or vice versa). When one of the plurality of openings is at least partially overlapped with the opening in the outer fixed sleeve 410, the outlet air is vented. Additionally or alternatively, a duct can be coupled to the outer fixed sleeve 410 to direct the outlet air to a different location.

The example valve 304 also includes a second sleeve valve 420. The second sleeve valve 420 operates as an add-heat valve (sometimes referred to as a recirculation valve) to enable at least a portion of the outlet air from the compressor outlet 314 (FIG. 2) to mix with the inlet air and flow back into the compressor inlet 312 (FIG. 2). The second sleeve valve 420 includes an inner fixed sleeve 422 and an inner rotatable sleeve 424. In this example, the inner rotatable sleeve 424 is disposed outside of the inner fixed sleeve 422. The inner fixed sleeve 422 is fixed or stationary and the inner rotatable sleeve 424 is rotatable relative to the inner fixed sleeve 422. The inner rotatable sleeve 424 is sealingly engaged with and slides along an outer surface 426 of the inner fixed sleeve 422 such that air cannot flow between the inner fixed sleeve 422 and the inner rotatable sleeve 424. The inner fixed sleeve 422 and the inner rotatable sleeve 424 may form a slip fit. Additionally or alternatively, one or more bearing, bushing, and/or sealing elements may be disposed between the inner fixed sleeve 422 and the inner rotatable sleeve 424 to enable the inner rotatable sleeve 424 to rotate smoothly.

The second sleeve valve 420 is operable between a closed state and an open state. In the illustrated example, the inner fixed sleeve 422 has a first plurality of openings 428 (one of which is referenced in FIG. 4) that are spaced apart from each other around the inner fixed sleeve 422, and the inner rotatable sleeve 424 has a second plurality of openings 430 (one of which is referenced in FIG. 4) that are spaced apart from each other around the inner rotatable sleeve 424. In the closed state, the inner rotatable sleeve 424 is rotated to a position in which the first and second plurality of openings 428, 430 are not overlapping. As a result, air is prevented from flowing through the inner rotatable sleeve 424 and the inner fixed sleeve 422 and to the compressor inlet 312. In the open state, the inner rotatable sleeve 424 is rotated to a position in which the first and second plurality of openings 428, 430 are at least partially overlapping, which enables air to flow through the inner rotatable sleeve 424 and the inner fixed sleeve 422 to the compressor inlet 312. In FIG. 4, the first and second plurality of openings 428, 430 are shown as fully overlapping.

When the valve 304 is assembled, the first sleeve valve 408 is disposed between the first and second end plates 400, 404, and the second sleeve valve 420 is disposed between the first and second end plates 400, 404 such that the plenum 326 (FIG. 3) is defined between the first end plate 400, the second end plate 404, the first sleeve valve 408, and the second sleeve valve 420. The second end plate 404 includes an opening 432. The auxiliary fluid line 320 is to be fluidly coupled to the opening 432 to direct the compressor outlet air into the opening 432 to fill the plenum 326.

To actuate the first and second sleeve valves 408, 420, the valve 304 includes the actuator 322. The actuator 322 operates to rotate the outer rotatable sleeve 412 and the inner rotatable sleeve 424. The actuator 322 includes a drive shaft 436 (e.g., an output shaft). When activated, the actuator 322 can rotate the drive shaft 436 in a first direction or a second direction opposite the first direction. In this example, the actuator 322 is a hydraulic rotary actuator. In other examples, the actuator 322 may be implemented as a pneumatic actuator, electric actuator (e.g., a DC servo motor), or any other type of actuator. In the illustrated example, the valve 304 includes a first gear 438 and a second gear 440 that are coupled to the drive shaft 436. The first gear 438 is coupled to the drive shaft 436 via a first clutch 442, and the second gear 440 is coupled to the drive shaft 436 via a second clutch 444. The first and second clutches 442, 444 are overrunning clutches (sometimes referred to as a freewheel, a no-back clutch, or a one-way roller clutch). The first and second clutches 442, 444 may be sprag clutches, for example. Operations of the first and second clutches 442, 444 are disclosed in further detail in connection with FIGS. 8A, 8B, 9A, and 9B.

In the illustrated example, the outer rotatable sleeve 412 of the first sleeve valve 408 includes first gear teeth 446 around an inside of the outer rotatable sleeve 412. The inner rotatable sleeve 424 of the second sleeve valve 420 includes second gear teeth 448 around an outside of the inner rotatable sleeve 424. When the valve 304 is assembled, the first gear 438 is engaged with the first gear teeth 446 on the inside of the outer rotatable sleeve 412, and the second gear 440 is engaged with the second gear teeth 448 on the outside of the inner rotatable sleeve 424. The outer rotatable sleeve 412 has a first slot 450 in the first gear teeth 446 such that the second gear 440 does not engage the second gear teeth 448 on the outer rotatable sleeve 412. Similarly, the inner rotatable sleeve 424 has a second slot 452 in the second gear teeth 448 such that the first gear 438 does not engage the second gear teeth 448 on the inner rotatable sleeve 424.

The second end plate 404 includes an opening 454. When the valve 304 is assembled, the drive shaft 436 extends through the opening 454. A bearing 456 is disposed in the opening 454 to seal the opening 454 and enable the drive shaft 436 to rotate smoothly.

FIG. 5 is a partially assembled perspective view of the valve 304. As shown in FIG. 5, the second sleeve valve 420 is disposed within the first sleeve valve 408 and coaxial relative to the first sleeve valve 408. The first end plate 400 is coupled to one side of the first and second sleeve valves 408, 420 and the second end plate 404 is to be coupled to the opposite side of the first and second sleeve valves 408, 420. When the valve 304 is assembled, the plenum 330 is defined between the first end plate 400, the second end plate 404, the outer rotatable sleeve 412, and the inner rotatable sleeve 424. The outlet air from the compressor outlet 314 (FIG. 3) fills the plenum 330. The outlet air can be vented to the atmosphere via the first sleeve valve 408 and/or provided to the compressor inlet 312 (FIG. 3) via the second sleeve valve 420. When the valve 304 is assembled, the first gear 438 is engaged with the first gear teeth 446 on the outer rotatable sleeve 412, and the second gear 440 is engaged with the second gear teeth 448 on the inner rotatable sleeve 424.

FIG. 6 is an assembled perspective view of the valve 304. As shown in FIG. 6, the passageway 326 is formed through a center of the valve 304. The passageway 326 is defined by the openings 402, 406 (FIG. 4) of the first and second end plates 400, 404 and the inner fixed sleeve 422. When the valve 304 is coupled to the compressor 302 (FIG. 2), the passageway 326 is fluidly coupled to the compressor inlet 312 (FIG. 2). As such, inlet air from the inlet fluid line 316 (FIG. 2) flows freely through the passageway 326 to the compressor inlet 312. In some examples, the first and second sleeve valves 408, 420 are coaxial with the compressor inlet 312. When the second sleeve valve 420 is in the open state, the outlet air in the plenum 330 (FIGS. 3 and 5) is provided to the passageway 326 for recirculation through the compressor 302. In the illustrated example, the third plurality of openings 428 (one of which is referenced in FIG. 6) are positioned around the circumference of the inner fixed sleeve 422 and, thus, around the passageway 326. Therefore, when the second sleeve valve 420 is opened, the outlet air is distributed evenly or symmetrically around the passageway 326. This results in improved pressure and temperature distribution in the compressor 302 (FIG. 2). In some examples, choking the flow just prior entering the compressor inlet 312 (FIG. 2) improves mixing, which results in improved add-heat functionality and compressor stability.

Figure 7:
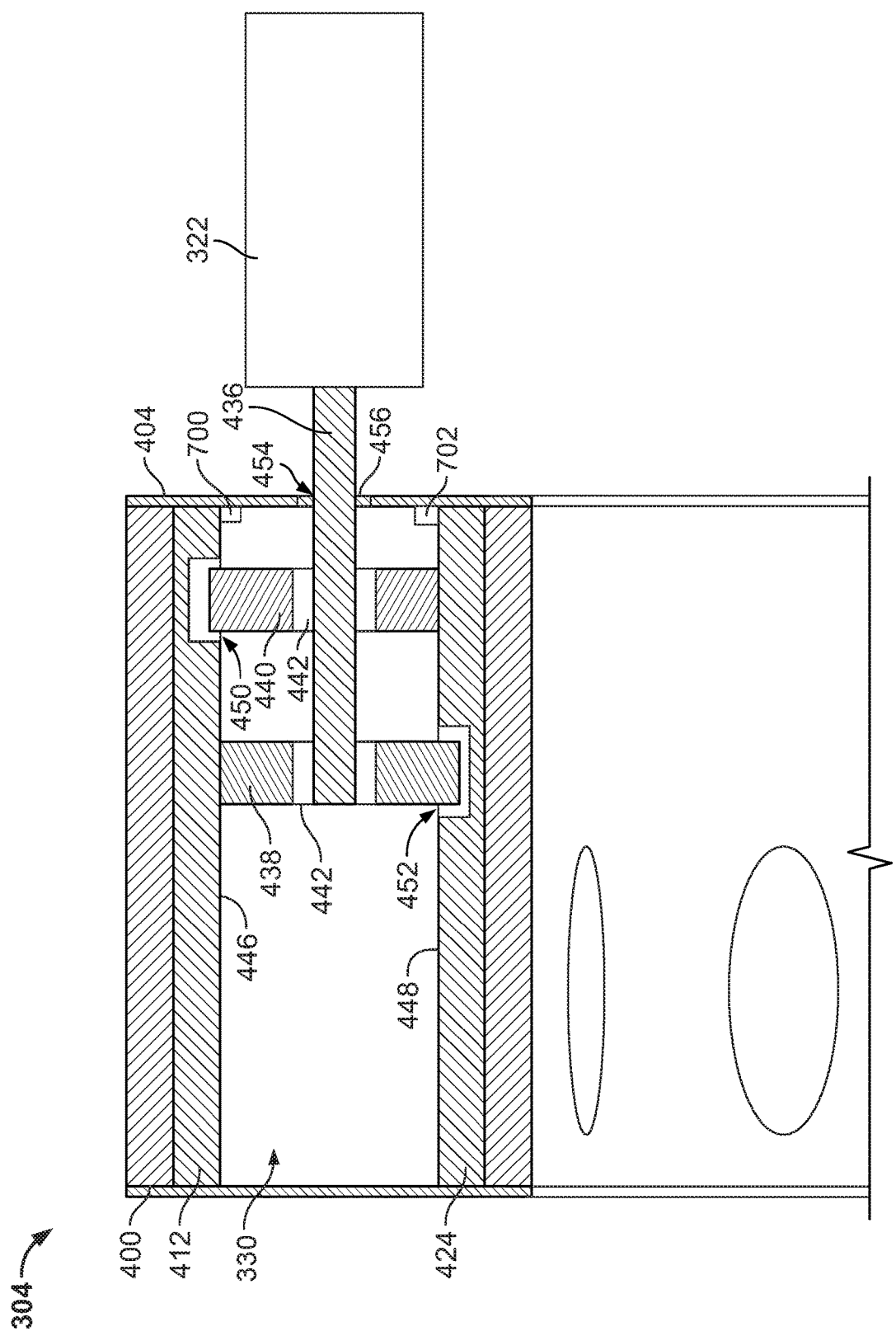
FIG. 7 is a cross-sectional view of the example valve of FIG. 2 taken along line A-A of FIG. 6.

FIG. 7 is a cross-sectional view of the valve 304 taken along line A-A of FIG. 6. FIG. 7 shows the plenum 330 as defined between the first end plate 400, the second end plate 404, the outer rotatable sleeve 412, and the inner rotatable sleeve 424.

In the illustrated example of FIG. 7, the drive shaft 436 of the actuator 322 extends through the bearing 456 in the opening 454 in the second end plate 404. The first gear 438 is coupled to the drive shaft 436 via the first clutch 442, and the second gear 440 is coupled to the drive shaft 436 via the second clutch 444. The first gear 438 is engaged with (e.g., meshed with) the first gear teeth 446 on the outer rotatable sleeve 412. The first gear 438 is aligned with the second slot 452 in the second gear teeth 448 of the inner rotatable sleeve 424. As such, the first gear 438 is not engaged with the inner rotatable sleeve 424 and, thus, does not drive the inner rotatable sleeve 424. Similarly, the second gear 440 is engaged with (e.g., meshed with) the second gear teeth 448 on the inner rotatable sleeve 424. The second gear 440 is aligned with the first slot 450 in the first gear teeth 446 of the outer rotatable sleeve 412. As such, the second gear 440 is not engaged with the outer rotatable sleeve 412 and, thus, does not drive the outer rotatable sleeve 412.

In some examples, the valve 304 includes one or more sensors to detect or determine the rotational position of the outer rotatable sleeve 412 and/or the inner rotatable sleeve 424. For example, as shown in FIG. 7, the valve 304 includes a first position sensor 700 for detecting the rotational or angular position of the outer rotatable sleeve 412 and a second position sensor 702 for detecting the rotational or angular position of the inner rotatable sleeve 424. The detected positions may be provided as feedback to the actuator 322. In some examples, the first and second position sensors 700, 702 are Hall Effect sensors, and the outer rotatable sleeve 412 and the inner rotatable sleeve 424 may have one or more magnets to interact with the Hall Effect sensors. In other examples, the first and second position sensors 700, 702 may be other types of position detection sensors. In the illustrated example, the first and second position sensors 700, 702 are disposed in the plenum 330. In other examples, the first and/or second position sensors 700, 702 may be located outside of the plenum 330.

In other examples, no position sensors may be provided. Instead, the actuator 322 may be calibrated when initially assembled to correlate the rotational position of the drive shaft 436 to the rotational positions of the outer rotatable sleeve 412 and the inner rotatable sleeve 424. Then, using a linear variable transformer, for example, the rotation of the drive shaft 436 can be measured and correlated to the positions of the outer rotatable sleeve 412 and the inner rotatable sleeve 424.

FIGS. 8A and 8B are cross-sectional views of the first clutch 442. In this example, the first clutch 442 is implemented as a sprag clutch, which is a type of overrunning clutch. The first clutch 442 includes an outer race 800, an inner race 802, and a plurality of movable sprags 804 (one of which is referenced in of FIGS. 8A and 8B) disposed between the outer race 800 and the inner race 802. In this example, the first gear 438 forms the outer race 800, and the drive shaft 436 forms the inner race 802. However, in other examples, the outer race 800 may be a separate component fixedly coupled to the first gear 438 and/or the inner race 802 may be a separate component fixedly coupled to the drive shaft 436. The sprags 804 are pivotable about their centers (extending into the page). In FIG. 8A, the drive shaft 436 is rotating in the counter-clockwise direction. This occurs, for example, during a surge operation. During a surge operation, the actuator 322 (FIG. 4) rotates the drive shaft 436 in the first direction, which is the counter-clockwise direction shown in FIGS. 8A and 8B. The interaction between the drive shaft 436 and the sprags 804 causes the sprags 804 to pivot into and engage the first gear 438. As a result, the drive shaft 436, the sprags 804, and the first gear 438 all rotate together, in the counter-clockwise direction. Therefore, when the actuator 322 drives the drive shaft 436 in the first direction (the counter-clockwise direction), the drive shaft 436 rotates the first gear 438 and, thus, rotates the outer rotatable sleeve 412 (FIG. 4) in the same direction.

In FIG. 8B, the drive shaft 436 is rotating in the clockwise direction independent of the first gear 438. This occurs, for example, during an add-heat operation. During an add-heat operation, the actuator 322 (FIG. 2) rotates the drive shaft 436 in the second direction, opposite the first direction, which is the clockwise direction shown in FIG. 8B. As shown in FIG. 8B, the drive shaft 436 slides along the inner surfaces of the sprags 804. However, this interaction does not cause the sprags 804 to frictionally engage the first gear 438. As such, the drive shaft 436 rotates in the clockwise direction without causing rotation of the first gear 438. Therefore, during an add-heat operation, the actuator 322 does not inadvertently drive or rotate the outer rotatable sleeve 412 of the first sleeve valve 408. Accordingly, when the drive shaft 436 is rotated in the first direction, the first gear 438 rotates in the first direction, and when the drive shaft 436 is rotated in the second direction, the first gear 438 does not rotate in the second direction.

FIGS. 9A and 9B are cross-sectional views of the second clutch 444. The second clutch 444 is also implemented as a sprag clutch. Similar to the first clutch 442 described above, the second clutch 444 includes an outer race 900, an inner race 902, and a plurality of movable sprags 904 (one of which is referenced in each of FIGS. 9A and 9B) disposed between the outer race 900 and the inner race 902. In this example, the second gear 440 forms the outer race 900, and the drive shaft 436 forms the inner race 902. However, in other examples, the outer race 900 may be a separate component fixedly coupled to the second gear 440 and/or the inner race 902 may be a separate component fixedly coupled to the drive shaft 436. The sprags 904 are pivotable about their centers (extending into the page). In this example, the sprags 904 of the second clutch 444 are arranged opposite of the sprags 804 of the first clutch 442. In FIG. 9A, the drive shaft 436 is rotating in the first direction, which is counter-clockwise direction. This occurs, for example, during a surge operation. During a surge operation, the actuator 322 rotates the drive shaft 436 in first direction. As shown in FIG. 9A, the drive shaft 436 slides along the inner surfaces of the sprags 904. However, this interaction does not cause the sprags 904 to frictionally engage the second gear 440. As such, the drive shaft 436 rotates in the first direction (the counter-clockwise direction) without causing rotation of the second gear 440. Therefore, during a surge operation, the actuator 322 (FIG. 2) does not inadvertently drive or rotate the inner rotatable sleeve 424 (FIG. 4) of the second sleeve valve 420 (FIG. 4).

In FIG. 9B, the drive shaft 436 is rotating in the second direction, which is the clockwise direction in FIG. 9B. This occurs, for example, during an add-heat operation. During an add-heat operation, the actuator 322 (FIG. 2) rotates the drive shaft 436 in the second direction. The interaction between the drive shaft 436 and the sprags 904 causes the sprags 904 to pivot into and engage the second gear 440. As a result, the drive shaft 436, the sprags 904, and the second gear 440 all rotate together, in the second direction. Therefore, when the actuator 322 (FIG. 2) drives the drive shaft 346 in the second direction, the drive shaft 436 rotates the second gear 440, thus, rotates the inner rotatable sleeve 424 in the same direction. Thus, when the drive shaft 436 is rotated in the first direction, the second gear 440 is not rotated in the first direction, and when the drive shaft 436 is rotated in the second direction, the second gear 440 is rotated in the second direction.

Accordingly, when the actuator 322 (FIG. 2) rotates the drive shaft 436 in the first direction (a counter-clockwise direction), the drive shaft 436 drives the first gear 438 but does not drive the second gear 440. Therefore, the outer rotatable sleeve 412 (FIG. 4) is rotated but the inner rotatable sleeve 424 (FIG. 4) is not rotated (e.g., remains stationary). The outer rotatable sleeve 412 may be rotated to a desired position to open or close the first sleeve valve 408, independent of the second sleeve valve 420 (FIG. 4). Conversely, when the actuator 322 rotates the drive shaft 436 in the second direction (a clockwise direction) opposite the first direction, the drive shaft 436 drives the second gear 440 but does not drive the first gear 438. As such, the inner rotatable sleeve 424 is rotated but the outer rotatable sleeve 412 is not rotated (e.g., remains stationary). The inner rotatable sleeve 424 may be rotated to a desired position to open or close the second sleeve valve 420 independent of the first sleeve valve 408. The actuator 322 can switch back-and-forth between rotating the drive shaft 436 in the first direction or the second direction to control (e.g., open or close) the first and second sleeve valves 408, 420. The first and second sleeve valves 408, 420 may be operated such that both of the first and second sleeve valves 408, 420 are closed, one of the first and second sleeve valves 408, 420 is open while the other is closed, or both of the first and second sleeve valves 408, 420 are open.

Therefore, in this example, a single actuator operates both the first sleeve valve 408 and the second sleeve valve 420 to control both the surge bleed and add-heat operations. Further, because the valve 304 distributes the add-heat air uniformly around the passageway 326, the inlet guide vanes and an actuator for the inlet guide vanes can be eliminated. As such, with the example compressor system 300, the number of actuators is reduced from three to one (compared to compressor systems having inlet guide vanes) or from two to one (compared to compressor systems without inlet guide vanes). Using a single actuator reduces the overall space consumed by the valve 304 and reduces overall weight of the valve 304.

While in this example the drive shaft 436 is coupled to or otherwise forms the inner races 802, 902, and the first and second gears 438, 440 are coupled to the respective outer races 800, 900, in other examples, the drive shaft 436 may be coupled to the outer races 800, 900 and the first and second gears 438, 440 may be coupled to the respective inner races 800, 802. Also, while in this example the first and second clutches 442, 444 as sprag clutches, in other examples, the first and second clutches 442, 444 can be implemented as other types of overrunning clutches, such as a roller ramp clutch, a wrap spring clutch, or a wedge style clutch.

Figure 10:
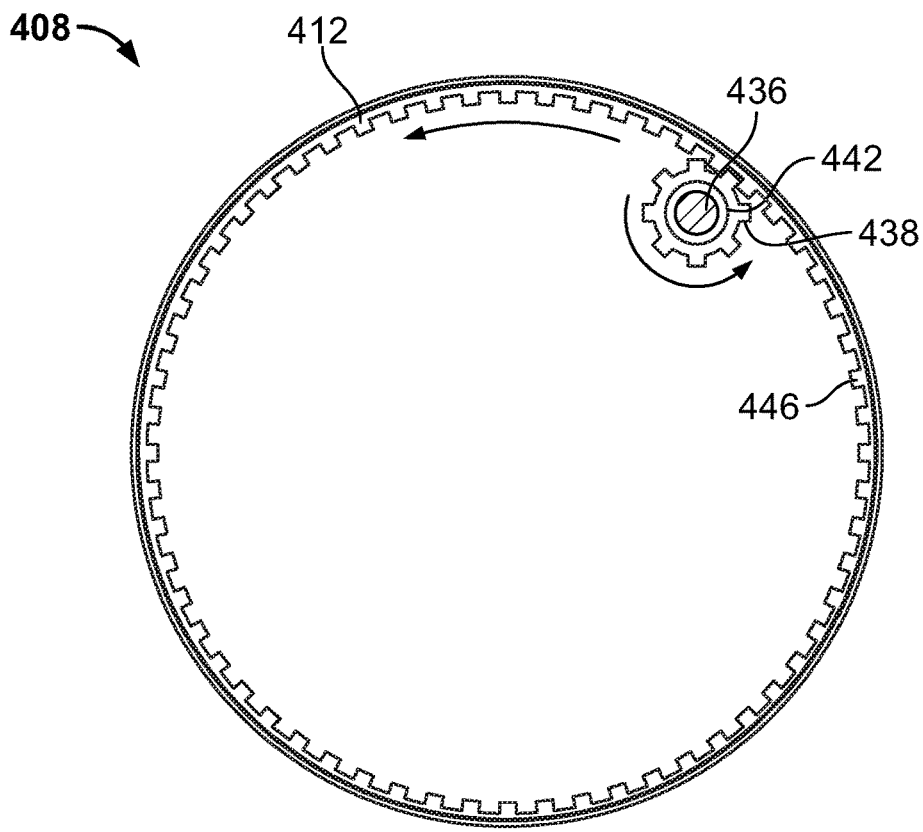
FIG. 10 is an end view of a first example sleeve valve and a first example gear of the example valve of FIG. 2.

FIG. 10 is an end view of the first sleeve valve 408 and the first gear 438. The first gear 438 is engaged with the first gear teeth 446 on the inside of the outer rotatable sleeve 412. When the actuator 322 (FIG. 2) drives the drive shaft 436 in the first direction (the counter-clockwise direction in FIG. 10), the first clutch 442 is engaged, and the drive shaft 436 rotates the first gear 438. The first gear 438 rotates the outer rotatable sleeve 412 in the first direction (the counter-clockwise direction).

Figure 11:
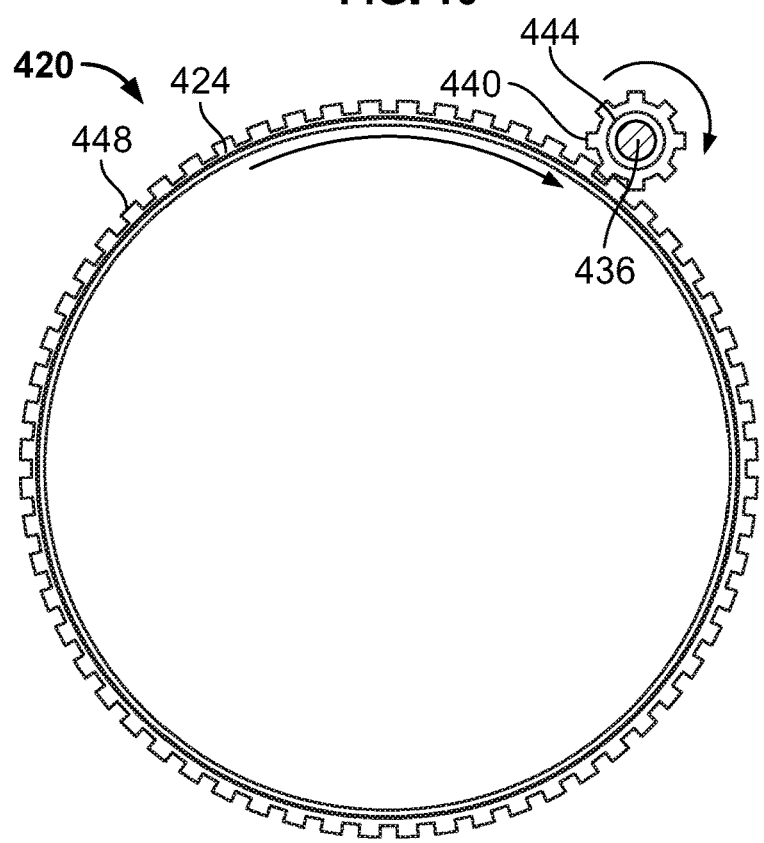
FIG. 11 is an end view of a second example sleeve valve and a second example gear of the example valve of FIG. 2.

FIG. 11 is an end view of the second sleeve valve 420 and the second gear 440. The second gear 440 is engaged with the second gear teeth 448 on the outside of the inner rotatable sleeve 424. When the actuator 322 (FIG. 4) drives the drive shaft 436 in the second direction (the clockwise direction in FIG. 11), the second clutch 444 is engaged, and the drive shaft 436 rotates the second gear 440. The second gear 440 rotates the inner rotatable sleeve 424 in the second direction (the clockwise direction).

Because of the arrangement of the first and second clutches 442, 444, the actuator 322 can only rotate the outer rotatable sleeve 412 in the first direction and can only rotate the inner rotatable sleeve 424 in the second direction opposite the first direction. Further, the actuator 322 can only rotate one of the outer rotatable sleeve 412 or the inner rotatable sleeve 424 at a time. The actuator 322 may be activated to switch back-and-forth between rotating the drive shaft 436 in the first direction to rotate the outer rotatable sleeve 412 and the second direction to rotate the inner rotatable sleeve 424.

While in this example a single actuator is used to operate both of the first and second sleeve valves 408, 420, in other examples, the valve 304 may include two actuators. One actuator may operate the first sleeve valve 408 by rotating the outer rotatable sleeve 412 and another actuator may operate the second sleeve valve 420 by rotating the inner rotatable sleeve 424. In such an example, the actuators may rotate the outer rotatable sleeve 412 and the inner rotatable sleeve 424 in either direction. Further, in such an example, the actuators may be activated to simultaneously rotate both the outer rotatable sleeve 412 and the inner rotatable sleeve 424.

Figure 12C:
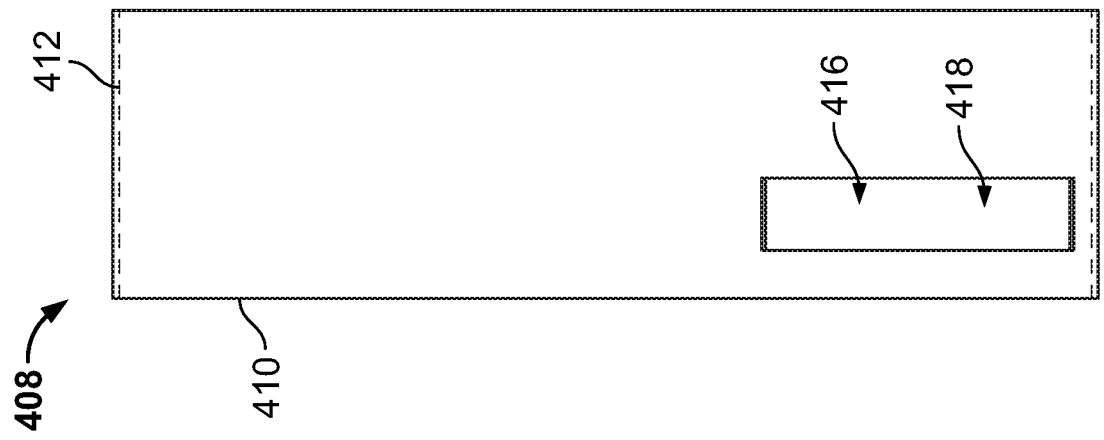
FIGS. 12A-12C are side views of the first example sleeve valve of FIG. 10 in a closed state, a partially opened state, and a fully opened state, respectively.
Figure 12B:
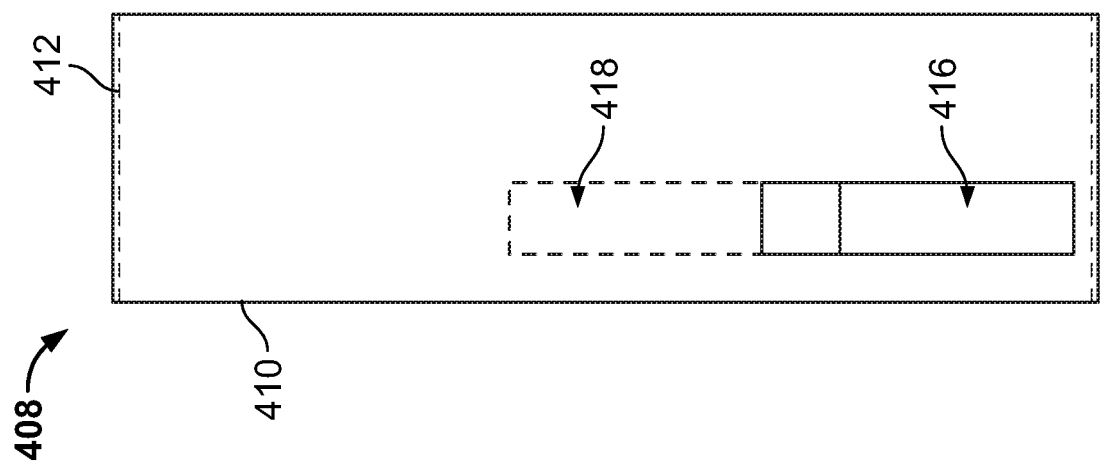
Figure 12A:
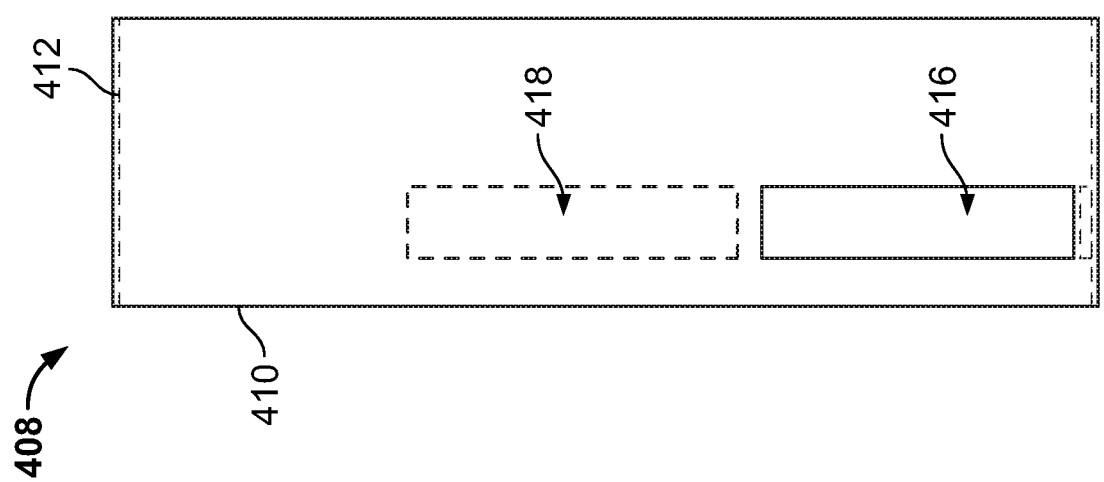

FIG. 12A is a side view of the first sleeve valve 408 in the closed state. In the closed state, the first and second openings 416, 418 are not overlapping. In this state, the outlet air in the plenum 330 (FIGS. 3 and 5) is prevented from flowing though outer fixed and rotatable sleeves 410, 412 to vent to the atmosphere.

FIG. 12B is a side view of the first sleeve valve 408 in a partially opened state. The outer rotatable sleeve 412 has been rotated such that the first and second openings 416, 418 are partially overlapping. In this state, the outlet air from the plenum 330 (FIGS. 3 and 5) flows through the outer fixed and rotatable sleeves 410, 412 to vent the compressor outlet 314 to the atmosphere. The air flow is partially restricted because the first and second openings 416, 418 are only partially overlapping.

FIG. 12C is a side view of the first sleeve valve 408 in a fully opened state. The outer rotatable sleeve 412 has been rotated such that the first and second openings 416, 418 are completely aligned or overlapping for maximum air flow. In this state, the outlet air from the plenum 330 (FIGS. 3 and 5) flows through the outer fixed and rotatable sleeves 410, 412 to vent the compressor outlet 314 to the atmosphere.

To close the first sleeve valve 408, the outer rotatable sleeve 412 can be rotated further until the first and second openings 416, 418 are no longer overlapping. Thus, as the outer rotatable sleeve 412 is rotated, the first sleeve valve 408 is cycled between the open and closed states. The actuator 322 can be activated to continue rotating the outer rotatable sleeve 412 until the desired open state (e.g., fully opened state or partially opened state) or closed state is reached.

In this example, the first and second plurality 416, 418 are the same size and shape. In this example, the first and second openings 416, 418 are large rectangles. This enables high air flow when the first and second openings 416, 418 are overlapping. In other examples, the shapes and sizes of the first and second openings 416, 418 may be different.

FIG. 13A is a side view of the second sleeve valve 420 in the closed state. In the closed state, the first and second plurality of openings 428, 430 are not overlapping. As such, the outlet air in the plenum 330 (FIGS. 3 and 5) is prevented from flowing the through the inner fixed and rotatable sleeves 422, 424 to the compressor inlet 312 (FIG. 2).

FIG. 13B is a side view of the second sleeve valve 420 in a partially opened state. The inner rotatable sleeve 424 has been rotated such that the first and second plurality of openings 428, 430 are partially overlapping. In this state, the outlet air from the plenum 330 (FIGS. 3 and 5) flows through the inner fixed and rotatable sleeves 422, 424 and into the compressor inlet 312 (FIG. 2). The air flow is partially restricted because the first and second plurality of openings 428, 430 are only partially overlapping. This partially opened position can be used to effectively choke the air flow, which increases the velocity of the air flow into the inlet stream thereby improving mixing.

FIG. 13C is a side view of the second sleeve valve 420 in a fully opened state. The inner rotatable sleeve 424 has been rotated such that the first and second plurality of openings 428, 430 are completely aligned or overlapping for maximum flow. In this position, the outlet air from the plenum 330 (FIGS. 3 and 5) flows through the inner fixed and rotatable sleeves 422, 424 and into the compressor inlet 312 (FIG. 2).

To close the second sleeve valve 420, the inner rotatable sleeve 424 can be rotated further until the first and second openings 428, 430 are no longer overlapping. Thus, as the inner rotatable sleeve 424 is rotated, the second sleeve valve 420 is cycled between the open and closed states. The actuator 322 (FIG. 2) can be activated to continue rotating the inner rotatable sleeve 424 until the desired open state (e.g., fully opened state or partially opened state) or closed state is reached. Because the first and second plurality of openings 426, 428 are disposed around the circumferences of the inner fixed and rotatable sleeves 422, 424, the inner rotatable sleeve 424 only needs to rotate a small degree (e.g., 15°) to switch between an open state and a closed state. Therefore, the actuator 322 only has to rotate the inner rotatable sleeve 424 through a small angular change. The distance between the adjacent ones of the openings can be increased or decreased to affect the rotation needed to open or close the second sleeve valve 420.

In this example, the first and second plurality of openings 428, 430 are the same shape and size. In this example, the first and second plurality of openings 428, 430 are circles. In other examples, the shapes and sizes of the first and second plurality of openings 428, 430 may be different. In other examples, the inner fixed and rotatable sleeves 422, 424 may have more or fewer openings. For example, each of the inner fixed and rotatable sleeves 422, 424 may have only one opening.

As can been seen from FIGS. 12A-12C and FIGS. 13A-13C, the first and second openings 416, 418 have a same first shape (e.g., a rectangle), and the first and second plurality of openings 428, 430 have a same second shape (e.g., a circle) different than the first shape. In other examples, the first and second shapes may be the same. In some examples, the first and second openings 416, 428 are larger than the first and second plurality of openings 428, 430. This enables higher flow through the first sleeve valve 408, which is often desirable for quick surge bleed.

Figure 14:
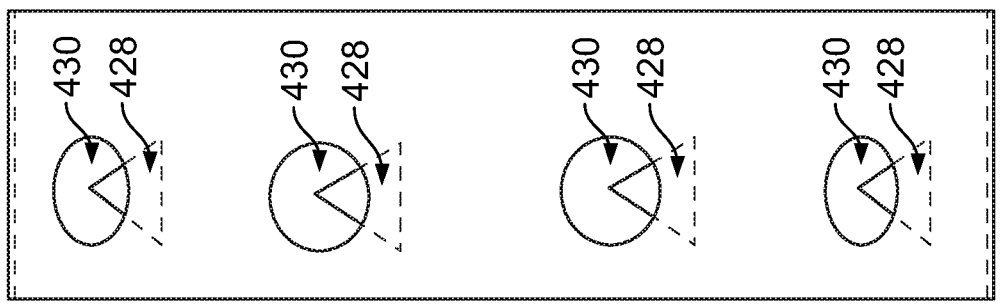
FIG. 14 shows alternative shaped openings that may be implemented in connection with the second example sleeve valve of FIG. 11.

In some examples, the shapes of the third first and second plurality of openings 428, 430 of the second sleeve valve 420 may be designed to achieve precise air flow control for choking. For example, FIG. 14 shows an example in which the first plurality of openings 428 in the inner fixed sleeve 422 are triangular, while the second plurality of openings 430 in the inner rotatable sleeve 424 are circular. As the openings 428, 430 begin to overlap, a very small amount of air flow is allowed. These example shapes allow for precise control so the air flow can be choked. In other examples, other shapes may be utilized.

Figure 15:
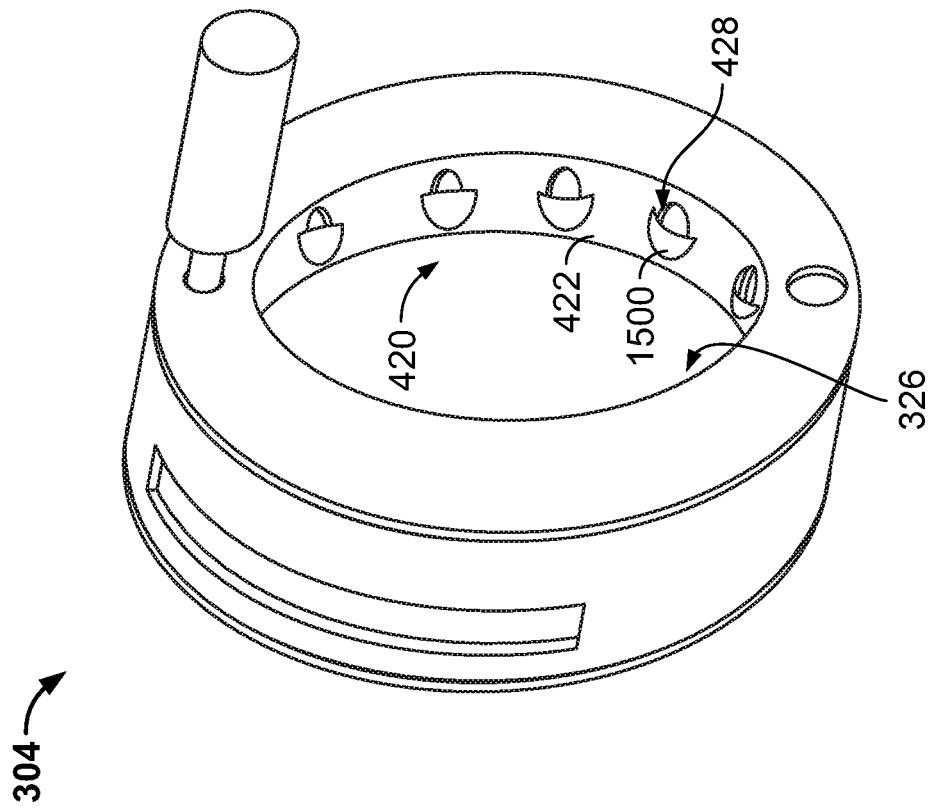
FIG. 15 shows example lobes that may be implemented in connection with the example valve of FIG. 2.

In some examples, to enhance air flow from the second sleeve valve 420 into the compressor inlet 312, the example valve 304 may include lobes. FIG. 15 shows an example in which the valve 304 includes a plurality of lobes 1500 (one of which is referenced in FIG. 15) coupled to the inside of the inner fixed sleeve 422 of the second sleeve valve 420.

The lobes 1500 are located at each of the third openings 428 (one of which is referenced in FIG. 15) in the inner fixed sleeve 422. The lobes 1500 face aft, or away from the compressor inlet 312 (FIG. 2), to direct the add-heat air into the incoming inlet air. In other examples, the lobes 1500 can be oriented in other directions. In this example, the lobes 1500 are directed axially relative to the passageway 326. In other examples, the lobes 1500 can be directed slightly radially to produce swirling. Additionally or alternatively, the lobes 1500 may include one or more vanes to cause swirling.

FIG. 16 is a schematic illustration of an example system 1600 utilizing the example compressor system 300 to produce pressurized air for an ECS 1602 and/or one or more other systems 1604 of the aircraft 100 (FIG. 1) that receive and utilize pressurized air. The pressurized air produced by the compressor system 300 is used by the ECS 1602 to pressurize the cabin 108 as well as provide cooler air for regulating the temperature of the air in the cabin 108 to a comfortable setting. The system(s) 1604 may include, for example, a wing anti-icing system, an engine anti-icing system, a generator, and/or any other system that utilizes pressurized air. The example system 1600 of FIG. 16 is shown as being implemented in connection with the first engine 110 (shown in a partial cutaway view) of the example aircraft 100 (FIG. 1). A similar system 1600 may be implemented in connection with the second engine 112 (FIG. 1). Thus, in some examples, two of the example systems 1600 are implemented on the aircraft 100 (FIG. 1). In other examples, only one of the example systems 1600 is implemented in connection with one of the engines 110, 112 on the aircraft 100 (FIG. 1).

The compressor 302 of the example compressor system 300 is driven by the first engine 110. In the illustrated example of FIG. 16, the first engine 110 is implemented as turbofan engine having a gas turbine engine 1606 (sometimes referred to as an engine core) and a fan 1608. The gas turbine engine 1606 drives the fan 1608 to produce thrust. The fan 1608 rotates within a nacelle 1610 of the first engine 110. A fan duct 1612 (e.g., a bypass, a passageway, a channel, a nozzle duct, etc.) is defined between an outer wall 1614 (sometimes referred to as a core cowl) of the gas turbine engine 1606 and the nacelle 1610. As the fan 1608 rotates, the fan 1608 produces airflow. A portion of the airflow flows through the fan duct 1612 and bypasses the gas turbine engine 1606 to produce forward thrust and another portion of the airflow is also provided to the gas turbine engine 1606 for combustion.

The gas turbine engine 1606 operates by drawing air through a core air intake 1616 (at a fore end of the gas turbine engine 1606) and into a compressor 1618. The compressor 1618 can include multiple compressor sections. For example, the compressor 1618 of FIG. 16 is a dual-axial compressor that includes a first compressor 1620 and a second compressor 1622. Each of the first and second compressors 1620, 1622 includes various compressor stages that progressively increase the pressure of the air as the air flows from the core air intake 1616 to a combustion chamber 1624. The first compressor 1620 is a low-pressure compressor (LPC) that provides relatively low pressure air and the second compressor 1622 is a high-pressure compressor (HPC) that provides relatively high pressure air. The first compressor 1620 is coupled to a first drive shaft 1626 (sometimes referred to as a low speed spool or N1), and the second compressor 1622 is coupled to a second drive shaft 1628 (sometimes referred to as a high speed spool or N2). The first drive shaft 1626 is coupled to and driven by a first turbine 1630 (e.g., a low-pressure turbine (LPT)) and the second drive shaft 1628 is coupled to and driven a second turbine 1632 (e.g., a high-pressure turbine (HPT)). In this example, the compressor 1618 is a dual-axial compressor that includes the two compressors 1620, 1622. However, in other examples, the compressor 1618 can include more or fewer compressor sections, each coupled to a turbine via a respective shaft.

After exiting the second compressor 1622 (the HPC), the highly pressurized air is provided to the combustion chamber 1624 where fuel is injected and mixed with the highly pressurized air and ignited. The high energy airflow exiting the combustion chamber 1624 turns the blades of the first and second turbines 1630, 1632, which are coupled to respective ones of the first and second drive shafts 1626, 1628. The first drive shaft 1626 extends through and rotates independently of the second drive shaft 1628. As such, rotation of the first and second drive shafts 1626, 1628 turns the blades of the first and second compressors 1620, 1622 respectively. The heated air is exhausted via a nozzle 1634, in the aft direction, where it mixes with the accelerated airflow provided by the fan 1608 in the fan duct 1612 to produce forward thrust that propels the aircraft 100 (FIG. 1) in a forward direction. While in this example the first engine 110 is implemented as a turbofan engine, the example system 1600 can similarly be implemented in connection with other types of engines.

As illustrated in FIG. 16, the drive shaft 308 of the compressor 302 is operatively coupled to a gearbox 1636. The drive shaft 308 may be an output shaft or off-take of the gearbox 1636 or otherwise coupled to an output shaft or off-take of the gearbox 1636. The gearbox 1636 is driven by the gas turbine engine 1606 of the first engine 110. In the illustrated example, the gearbox 1636 is operatively coupled to a first end 1638 of a drive shaft 1640 (e.g., a radial drive shaft). The drive shaft 1640 rotates to provide power to the gearbox 1636 and, thus, to the compressor 302. In the illustrated example, a second end 1642 of the drive shaft 1640 is operatively coupled to the first engine 110. Specifically, in this example, the second end 1642 of the drive shaft 1640 is coupled to a first gear 1644. The first gear 1644 is engaged with a second gear 1646 that is operatively coupled to the HPC drive shaft 1628. As the HPC drive shaft 1628 rotates, the second gear 1646, which is engaged with the first gear 1644, rotates the first gear 1644 and, thus, the drive shaft 1640. In some examples, one or more other devices used in the aircraft 100 (FIG. 1) may be operatively coupled to and driven by the gearbox 1636, such as an electrical generator and/or a hydraulic pump.

Although the second gear 1646 is shown as operatively coupled to the HPC drive shaft 1628 in the illustrated example, in other examples the second gear 1646 may be operatively coupled to and driven by the LPC drive shaft 1626 or any other drive shaft of the first engine 110. In some examples, the compressor system 300 and/or the gearbox 1636 are disposed within the nacelle 1610 of the first engine 110.

The compressor inlet 312 receives inlet air via the inlet fluid line 316. The inlet air may be provided from one or more sources. In some examples, the inlet air is fan air. For example, the inlet fluid line 316 may be fluidly coupled to a port 1648 in the nacelle 1610 to provide fan air from the fan duct 1612 to the compressor inlet 312. Additionally or alternatively, the inlet air can be bleed air from one or more stages of the compressor 1618 of the gas turbine engine 1606. For example, the inlet fluid line 316 can be fluidly coupled to a port 1650 in the outer wall 1614 of the gas turbine engine 1606 to receive pressurized air from the second compressor 1622. Additionally or alternatively, the inlet air may be atmospheric air.

When the compressor 302 is driven, the compressor 302 increases a pressure of the inlet air from the compressor inlet 312 to the compressor outlet 314. The compressor outlet 314 is fluidly coupled to the ECS 1602 and the system(s) 1604 via the outlet fluid line 318. Thus, the compressor 302 increases a pressure of the inlet air and provides high pressure air to the ECS 1602 and system(s) 1604.

The example system 1600 includes a control system 1652 to operate the various devices and control the operation of the system 1600. The control system 1652 can be implemented by a controller or processor, such as the processor 1812 of the processor platform 1800 disclosed in connection with FIG. 18. The control system 1652 is communicatively coupled to one or more sensors (disclosed in further detail below), the actuator 322 of the valve 304, the gearbox 1636, and/or any other device (e.g., a valve, a regulator, etc.) that controls and/or monitors various parameters of the system 1600.

In the illustrated example, the control system 1652 includes an input/output module 1654, a comparator 1656, an actuator controller 1658, and a gearbox controller 1659. The input/output module 1654 receives signals from one or more sensors measuring one or more parameters of the system 1600. The comparator 1656 compares the measured values of the parameter(s) to one or more thresholds or threshold ranges. Based on whether the parameter(s) satisfy the thresholds or threshold ranges, the actuator controller 1658 can operate actuator 322 of the valve 304 to provide surge and/or add-heat operations to result in optimal air supply provided to the ECS 1602 and/or the system(s) 1604. In some examples, the gearbox controller 1659 controls the gearing between the gearbox 1636 and the compressor 302 to increase or decrease a speed of the compressor 302.

As disclosed above, one or more sensors (e.g., temperature sensors, pressure sensors, flow sensors, humidity sensors, etc.) can be used to measure the temperature, pressure, flow rate, water content, and/or any other parameters of the pressurized air at various points in the system 1600. For example, one or more sensor(s) 1660 is/are coupled to the outlet fluid line 318 to measure one or more parameters (e.g., temperature, pressure, etc.) of the pressurized air produced by the compressor 302. Additional sensors may be provided in various other locations to similarly measure one or more parameters of the air at various points in the system 1600.

An example operation of the system 200 is described below. Because the compressor 302 is constantly being driven by the gearbox 1636, the compressor 302 is constantly operating and producing pressurized air. In some instances, the gearbox 1636 does not include a clutch or disconnect, so the compressor 302 is constantly being driven. However, in some instances, there is little or no demand for pressurized air by the ECS 1602 and/or the system(s) 1604. For example, when the aircraft 100 is on the ground and/or taxiing, the cabin 108 is already pressurized and may be close to a comfortable temperature. As such, there is little or no demand for pressurized air by the ECS 1602. Therefore, the compressor 302 over-produces pressurized air at the compressor outlet 314. This excessive pressure can cause the compressor 302 to surge. The sensor(s) 1660 detect the pressure of the outlet air produced by the compressor 302. The comparator 1656 compares the pressure to a threshold pressure. If the pressure satisfies (e.g., meets and/or exceeds) the threshold pressure, the actuator controller 1658 activates the actuator 322 to partially or fully open the first sleeve valve 408 (FIG. 4) of the valve 304. For example, the actuator 322 may be activated to rotate the drive shaft 436 (FIG. 4) in the first direction, which causes the outer rotatable sleeve 412 (FIG. 4) to rotate, but the inner rotatable sleeve 424 (FIG. 4) is not rotated. When the first sleeve valve 408 is at least partially opened, pressurized air at the compressor outlet 314 is vented to atmosphere, thereby reducing or preventing compressor surging. Once the pressure returns to a desired or normal operating pressure, the actuator controller 1658 activates the actuator 322 to close the first sleeve valve 408. This cycle may be repeated as desired. Additionally, the gearbox controller 1659 can change the gearing in the gearbox 1636 to reduce the speed of the drive shaft 308.

In some instances, it may be desirable to increase the temperature of the pressurized air provided to the ECS 1602 and/or the system(s) 1604. For example, when the aircraft 100 is flying at high altitudes, the atmospheric air is relatively cold. Therefore, there is a higher demand for higher temperature air in the ECS 1602. The sensor(s) 1660 detect the temperature of the compressor outlet air produced by the compressor 302. The comparator 1656 compares the temperature to a temperature threshold. If the temperature does not satisfy (e.g., meet or exceed) the threshold temperature, the actuator controller 1658 activates the actuator 322 to partially open or fully open the second sleeve valve 420 (FIG. 4) of the valve 304. For example, the actuator 322 may be activated to rotate the drive shaft 436 in the second direction, opposite the first direction, which causes the inner rotatable sleeve 424 (FIG. 4) to rotate but the outer rotatable sleeve 412 (FIG. 4) is not rotated. When the second sleeve valve 420 is partially or fully opened, warm air from the compressor outlet 314 is diverted back to the air flowing into the compressor inlet 312, thereby increasing the temperature of the outlet air produced by the compressor 302. Once the temperature reaches a desired or normal operating temperature, the actuator controller 1658 activates the actuator 322 to close the second sleeve valve 420. This cycle may be repeated as desired. As described above, both the first and second sleeve valves 408, 420 may also be opened at the same time.

While an example manner of implementing the control system 1652 is illustrated in FIG. 16, one or more of the elements, processes and/or devices illustrated in FIG. 16 may be combined, divided, re-arranged, omitted, eliminated and/or implemented in any other way. Further, the example input/output module 1654, the example comparator 1656, the example actuator controller 1658, the example gearbox controller 1659, and/or, more generally, the example control system 1652 of FIG. 16 may be implemented by hardware, software, firmware and/or any combination of hardware, software and/or firmware. Thus, for example, any of the example input/output module 1654, the example comparator 1656, the example actuator controller 1658, the example gearbox controller 1659, and/or, more generally, the example control system 1652 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input/output module 1654, the example comparator 1656, the example actuator controller 1658, and/or the example gearbox controller 1659 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control system 1652 of FIG. 16 may include one or more elements, processes and/or devices in addition to, or instead of, those illustrated in FIG. 16, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 17A:
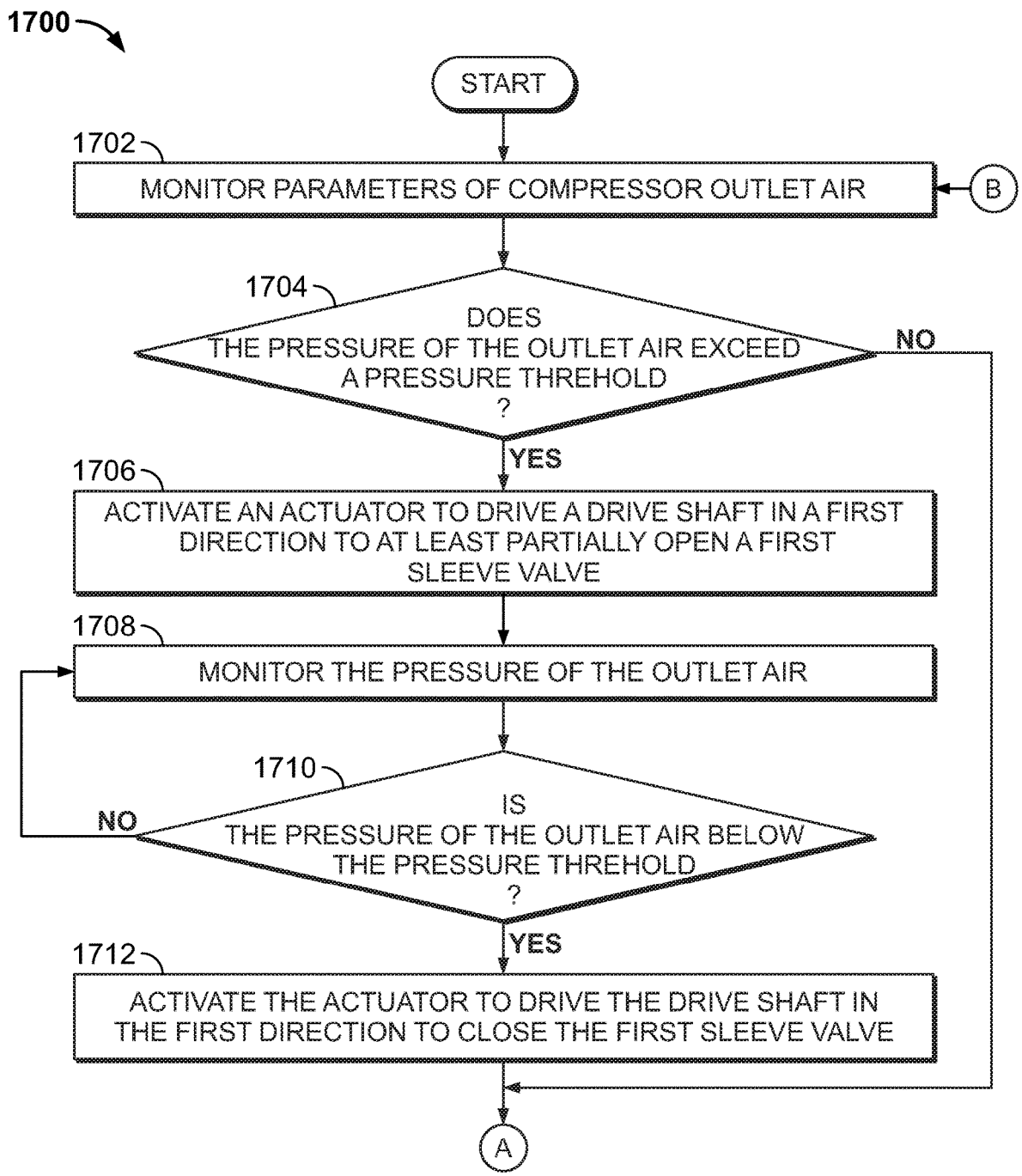
FIGS. 17A and 17B are a flowchart representative of example machine readable instructions that may be implemented by an example control system of the system of FIG. 16.
Figure 17B:
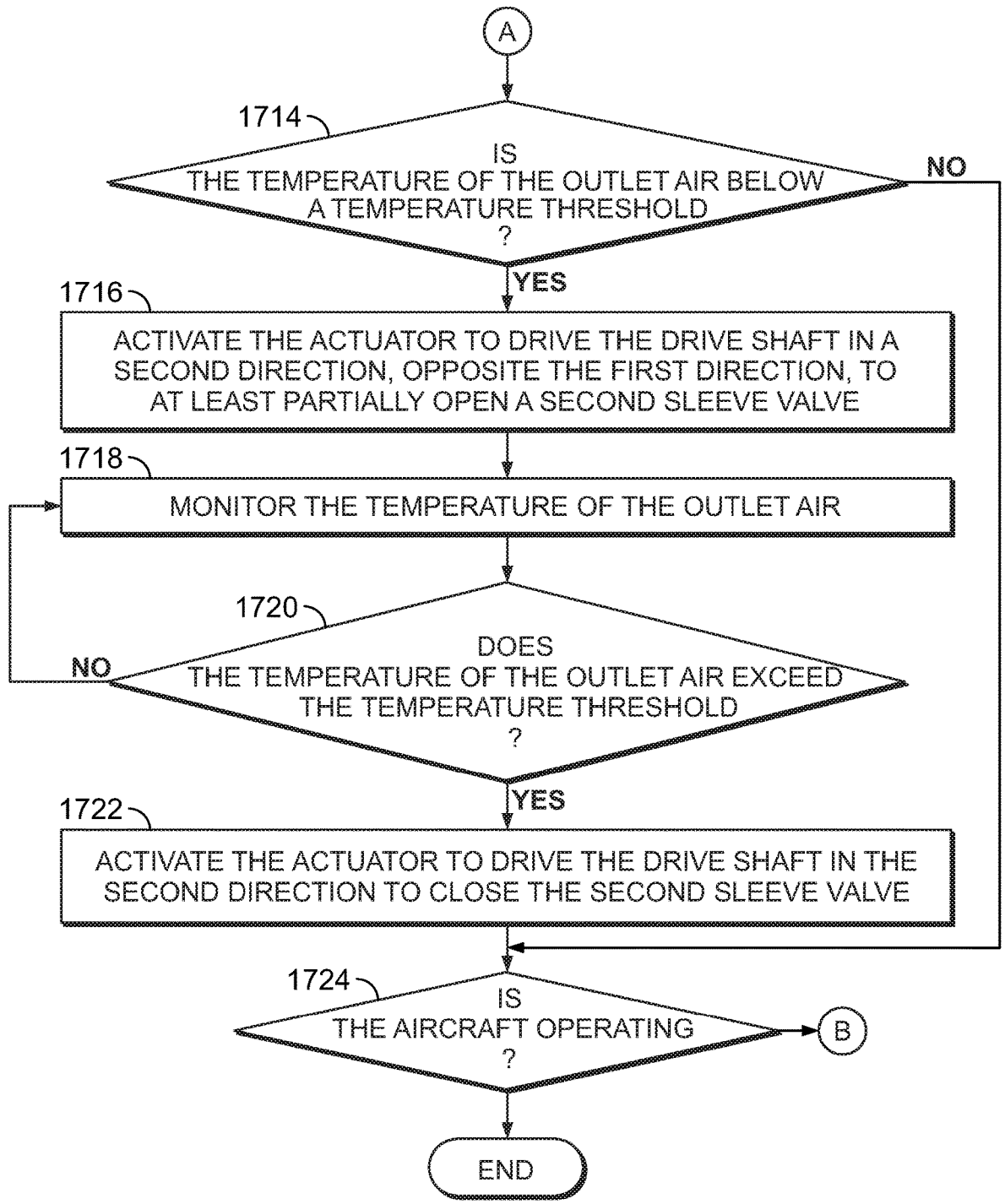

A flowchart representative of example hardware logic, machine readable instructions, hardware implemented state machines, and/or any combination thereof for implementing the example control system 1652 of FIG. 16 is shown in FIGS. 17A and 17B. The machine readable instructions may be one or more executable programs or portion(s) of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowchart illustrated in FIGS. 17A and 17B, many other methods of implementing the example control system 1652 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 17A and 17B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 17A and 17B are a flowchart representing an example process 1700 that may be implemented by the control system 1652 of FIG. 16 to control the operation of the system 1600. At block 1702, the control system 1652 monitors one or more parameter(s) of the compressor outlet air measured by the sensor(s) 1660. The input/output module 1654 receives the measured parameter values from the sensor(s) 1660 and the comparator 1656 compares the measured parameter(s) to one or more thresholds. At block 1704, the comparator 1656 determines whether the pressure of the outlet air exceeds a pressure threshold. If the pressure does not exceed the pressure threshold, control proceeds to block 1714 in FIG. 17B.

If the pressure of the outlet air exceeds the pressure threshold, the actuator controller 1658, at block 1706, activates the actuator 322 to rotate the drive shaft 436 in the first direction to at least partially open the first sleeve valve 408. This operation vents a portion of the outlet air to atmosphere, thereby reducing or preventing compressor surging. Depending on the level of venting desired, the first sleeve valve 408 can be opened more or less. At block 1708, the control system 1652 continues to monitor the pressure of the outlet air. At block 1710, the comparator determines if the pressure of the outlet air is below the threshold pressure. If not, control proceeds back to block 1708 and the control system 1652 continues to monitor the pressure of the outlet air. The actuator 322 may be activated to further open or close the first sleeve valve 408 based on the measured pressure. If the pressure has dropped between the threshold pressure, the actuator controller 1658, at block 1712, activates the actuator 322 to rotate the drive shaft 436 in the first direction to close the first sleeve valve 408.

The example process continues to FIG. 17B. At block 1714, the comparator 1656 determines whether the temperature of the outlet air is below a temperature threshold. If not, control proceeds to block 1724. If the temperature of the outlet air is below the temperature threshold, the actuator controller 1658, at block 1716, activates the actuator 322 to rotate the drive shaft 436 in the second direction, opposite the first direction, to at least partially open the second sleeve valve 420. This operation directs a portion of the warm outlet air back into the compressor inlet 312, thereby increasing the temperature of the outlet air. Depending on the desired temperature of the outlet air, the second sleeve valve 420 can be opened more or less. At block 1718, the control system 1652 continues to monitor the temperature of the outlet air.

At block 1720, the comparator 1656 determines whether the temperature of the outlet air has risen above the temperature threshold. If not, control proceeds back to block 1718 and the control system 1652 continues to monitor the temperature of the outlet air. If the temperature rises above the threshold temperature, the actuator controller 1658, at block 1722, activates the actuator 322 to rotate the drive shaft 436 in the second direction to close the second sleeve valve 420.

At block 1724, the control system 1652 determines whether the aircraft 100 is still operating (e.g., based on a status signal from the first engine 110). If the aircraft 100 is still operating, control proceeds back to block 1702. The example process 1700 may be repeated. If the aircraft 100 is not operating, the example process may end.

While in the example process of FIG. 17 one or more parameters of the compressor outlet air is/are used to determine whether to operate one or both of the first or second sleeve valves 408, 420, in other examples, one or more parameters of the compressor inlet air (e.g., pressure, temperature) can additionally or alternatively be used. For example, if the temperature of the compressor inlet air can be measured and if the temperature is above a threshold, it may be indicative of compressor surge, which triggers operation of the first sleeve valve 408 to vent the compressor outlet air. Additionally or alternatively, operation of the first and/or second valves 408, 420 may be based on certain predetermined operations, such as opening one or both of the first and second valves 408, 420 when a gear change occurs in the gearbox 1636.

While in the illustrated process the surge and add-heat operations are performed in series, it is understood that the example operations could be performed simultaneously. For example, the control system 1652 may open one of the first or second sleeve valves 408, 420, and then open the other of the first or second sleeve valves 408, 420 such that both the first and second sleeve valves 408, 420 are opened at the same time. The first and second sleeve valves may be adjusted and then closed.

Figure 18:
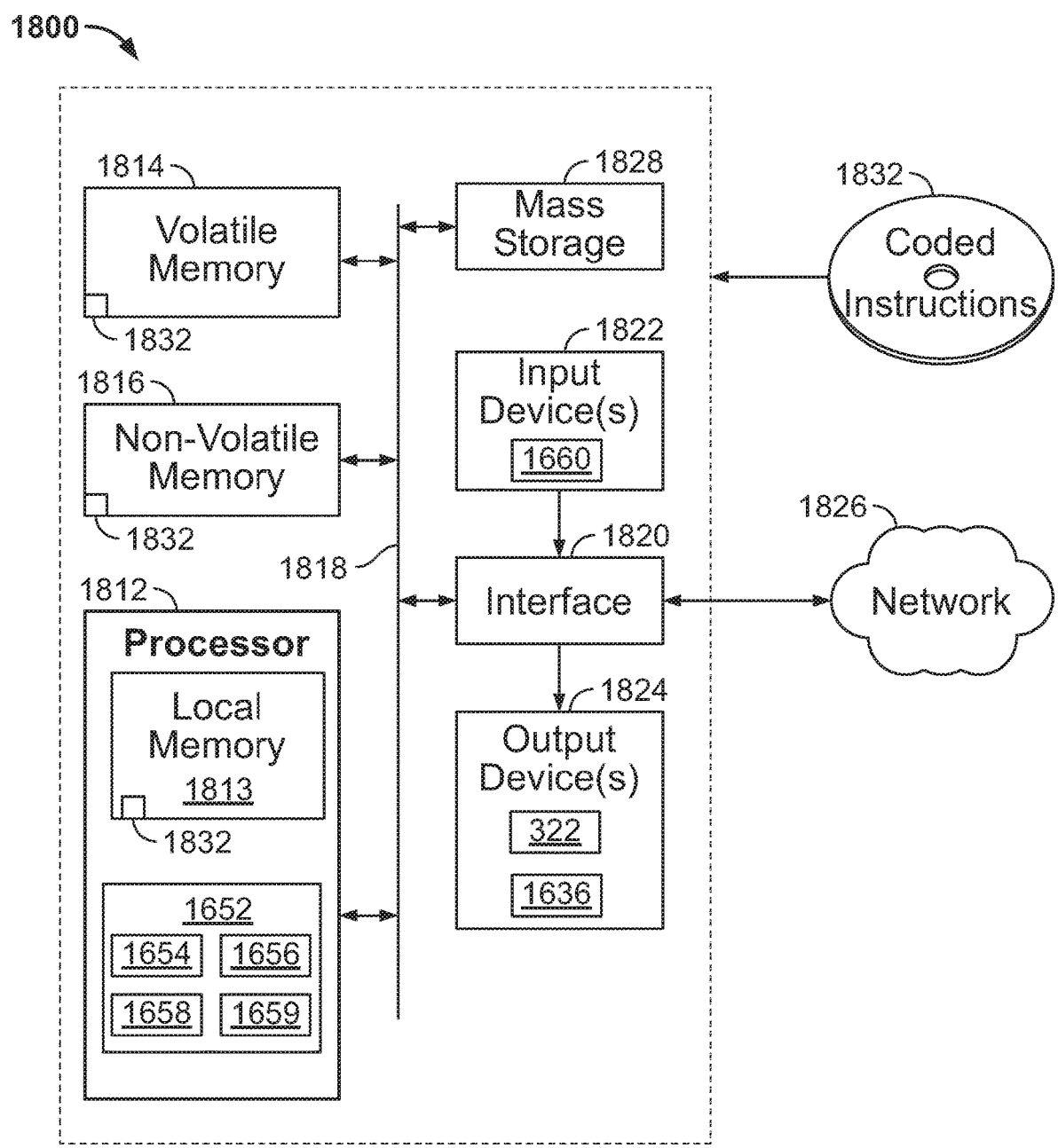
FIG. 18 is a block diagram of an example processing platform structured to execute the instructions of FIGS. 17A and 17B to implement the example control system of the system of FIG. 16.

FIG. 18 is a block diagram of an example processor platform 1800 structured to execute the instructions of FIGS. 17A and 17B to implement the control system 1652 of FIG. 16. The processor platform 1800 can be, for example, a server, a personal computer, a workstation, a self-learning machine (e.g., a neural network), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1812 implements the example input/output module 1654, the example comparator 1656, the example actuator controller 1658, the gearbox controller 1659, and/or, more generally, the example control system 1652.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a device and/or user to enter data and/or commands into the processor 1012. In this example, the input device(s) 1822 include the sensor(s) 1660. Additionally or alternatively, the input device(s) 1822 can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. In this example, the output device(s) 1824 include the actuator 322 and the gearbox 1636. Additionally or alternatively, the output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 1832 of FIGS. 17A and 17B may be stored in the mass storage device 1828, in the volatile memory 1814, in the non-volatile memory 1816, and/or on a removable non-transitory computer readable storage medium such as a CD or DVD.

From the foregoing, it will be appreciated that example methods, apparatus, and articles of manufacture that reduce the number of parts and space consumed by valves in a compressor system. The example valves disclosed herein are smaller and more compact than known valve configurations. The example valves disclosed herein can be used to perform both surge bleed and add-heat functions. Further, the example valves disclosed herein can operate using a single actuator instead of multiple actuator as in known systems.

Example valves disclosed herein also have improved pressure and temperature distribution for add-heat function, thereby eliminating or reducing the need for inlet guide vanes.

The following paragraphs provide various examples of the examples disclosed herein.

Example 1 is a valve for a compressor. The valve includes a first end plate, a second end plate, a first sleeve valve disposed between the first and second end plates, the first sleeve valve operable between a closed state and an open state, and a second sleeve valve disposed between the first and second end plates and within the first sleeve valve such that a plenum is formed between the first end plate, the second end plate, the first sleeve valve, and the second sleeve valve. The plenum is to receive outlet air from an outlet of the compressor. A passageway is formed through a center of the valve to be fluidly coupled to an inlet of the compressor. The second sleeve valve is operable between a closed state and an open state, wherein, when the first sleeve valve is in the open state, the outlet air in the plenum is vented to atmosphere to reduce or prevent compressor surging, and wherein, when the second sleeve valve is in the open state, the outlet air in the plenum is provided to the passageway for recirculation through the compressor.

Example 2 includes the valve of Example 1, wherein the first sleeve valve includes an outer fixed sleeve having a first opening and an outer rotatable sleeve having a second opening. In the closed state, the first and second openings are not overlapping, and in the open state, the first and second openings are at least partially overlapping.

Example 3 includes the valve of Example 2, wherein the second sleeve valve includes an inner fixed sleeve having a first plurality of openings and an inner rotatable sleeve having a second plurality of openings. In the closed state, the first and second plurality of openings are not overlapping, and in the open state, the first and second plurality of openings are at least partially overlapping.

Example 4 includes the valve of Example 3, further including an actuator to rotate the outer rotatable sleeve and the inner rotatable sleeve.

Example 5 includes the valve of Example 4, wherein the actuator has a drive shaft. The valve further includes a first gear coupled to the drive shaft and engaged with first gear teeth on an inside of the outer rotatable sleeve, and a second gear coupled to the drive shaft and engaged with second gear teeth on an outside of the inner rotatable sleeve.

Example 6 includes the valve of Example 5, wherein the first gear is coupled to the drive shaft via a first clutch such that when the drive shaft is rotated in a first direction, the first gear rotates in the first direction, and when the drive shaft is rotated in a second direction opposite the first direction, the first gear does not rotate in the second direction.

Example 7 includes the valve of Example 6, wherein the second gear is coupled to the drive shaft via a second clutch such that when the drive shaft is rotated in the first direction, the second gear is not rotated in the first direction, and when the drive shaft is rotated in the second direction, the second gear is rotated in the second direction.

Example 8 includes the valve of Example 7, wherein the outer rotatable sleeve has a first slot in the first gear teeth to receive the second gear such that the second gear does not engage the first gear teeth, and wherein the inner rotatable sleeve has a second slot in the second gear teeth to receive the first gear such that the first gear does not engage the second gear teeth.

Example 9 includes the valve of any of Examples 5-8, wherein, when the actuator rotates the drive shaft in a first direction, the outer rotatable sleeve is rotated in the first direction and the inner rotatable sleeve is not rotated, and when the actuator rotates the drive shaft in a second direction opposite the first direction, the inner rotatable sleeve is rotated in the second direction and the outer rotatable sleeve is not rotated.

Example 10 includes the valve of any of Examples 3-9, wherein the first opening and the second opening have a same first shape, and the first plurality of openings and the second plurality of openings have a same second shape different than the first shape.

Example 11 includes the valve of Example 10, wherein the first and second openings are larger than the first and second plurality of openings.

Example 12 is a compressor system including a compressor having a compressor inlet and a compressor outlet, an inlet fluid line to supply inlet air to the compressor inlet, and a valve including a first sleeve valve and a second sleeve valve disposed within. A plenum is defined between the first and second sleeve valves. The valve is coupled between the compressor inlet and the inlet fluid line. The valve defines a passageway for the inlet air to flow through the valve to the compressor inlet. The compressor system further includes an auxiliary fluid line fluidly coupling the compressor outlet and the plenum to provide outlet air from the compressor outlet to the plenum, wherein, the first sleeve valve is operable to vent the outlet air from the plenum to atmosphere, and wherein, the second sleeve valve is operable to provide the outlet air from the plenum into the passageway to be provided to the compressor inlet.

Example 13 includes the compressor system of Example 12, further including an actuator to operate both the first sleeve valve and the second sleeve valve.

Example 14 includes the compressor system of Examples 12 or 13, wherein the second sleeve valve has an inner fixed sleeve with a plurality of openings around the inner fixed sleeve such that when the second sleeve valve is at least partially opened the outlet air is distributed symmetrically around the passageway.

Example 15 includes the compressor system of Example 14, wherein the valve includes a plurality of lobes coupled to an inside of the inner fixed sleeve.

Example 16 is a system to provide pressurized air to a system of an aircraft that receives pressurized air. The system includes a gearbox driven by an engine of the aircraft, a compressor operatively coupled to and driven by the gearbox, the compressor having a compressor inlet and a compressor outlet, a valve including a first sleeve valve and a second sleeve valve disposed within the first sleeve valve and coaxial relative to the first sleeve valve, an inlet fluid line to supply inlet air to the compressor inlet, an outlet fluid line to fluidly couple the compressor outlet to the system of the aircraft that receives pressurized air, and an auxiliary fluid line fluidly coupling the compressor outlet and the valve to supply outlet air from the compressor outlet to the valve. The first sleeve valve is to vent outlet air from the compressor outlet to reduce or prevent compressor surging, and the second sleeve valve is to recirculate the outlet air from the compressor outlet back into the compressor inlet.

Example 17 includes the system of Example 16, wherein the first and second sleeve valves are coaxial with the compressor inlet.

Example 18 includes the system of Examples 16 or 17, wherein the valve includes an actuator to operate both the first sleeve valve and the second sleeve valve.

Example 19 includes the system of any of Examples 16-18, wherein the actuator includes a drive shaft that, when rotated in a first direction, operates the first sleeve valve and, when rotated in a second direction opposite the first direction, operates the second sleeve valve.

Example 20 includes the system of any of Examples 16-19, wherein the system of the aircraft that receives pressurized air is an environmental control system (ECS) of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A valve for a compressor, the valve comprising:
   a first end plate;
   a second end plate;
   a first sleeve valve disposed between the first and second end plates, the first sleeve valve operable between a closed state and an open state, the first sleeve valve including an outer fixed sleeve having a first opening and an outer rotatable sleeve having a second opening, in the closed state, the first and second openings are not overlapping, and in the open state, the first and second openings are at least partially overlapping; and
   a second sleeve valve disposed between the first and second end plates and within the first sleeve valve such that a plenum is formed between the first end plate, the second end plate, the first sleeve valve, and the second sleeve valve, the plenum to receive outlet air from an outlet of the compressor, a passageway formed through a center of the valve to be fluidly coupled to an inlet of the compressor, the second sleeve valve operable between a closed state and an open state, the second sleeve valve including an inner fixed sleeve having a first plurality of openings and an inner rotatable sleeve having a second plurality of openings, in the closed state, the first and second plurality of openings are not overlapping, and in the open state, the first and second plurality of openings are at least partially overlapping,
   wherein, when the first sleeve valve is in the open state, the outlet air in the plenum is vented to atmosphere to reduce or prevent compressor surging, and
   wherein, when the second sleeve valve is in the open state, the outlet air in the plenum is provided to the passageway for recirculation through the compressor.

2. The valve of claim 1, further including an actuator to rotate the outer rotatable sleeve and the inner rotatable sleeve.

3. The valve of claim 2, wherein the actuator has a drive shaft, further including:
   a first gear coupled to the drive shaft and engaged with first gear teeth on an inside of the outer rotatable sleeve; and
   a second gear coupled to the drive shaft and engaged with second gear teeth on an outside of the inner rotatable sleeve.

4. The valve of claim 3, wherein the first gear is coupled to the drive shaft via a first clutch such that when the drive shaft is rotated in a first direction, the first gear rotates in the first direction, and when the drive shaft is rotated in a second direction opposite the first direction, the first gear does not rotate in the second direction.

5. The valve of claim 4, wherein the second gear is coupled to the drive shaft via a second clutch such that when the drive shaft is rotated in the first direction, the second gear is not rotated in the first direction, and when the drive shaft is rotated in the second direction, the second gear is rotated in the second direction.

6. The valve of claim 5, wherein the outer rotatable sleeve has a first slot in the first gear teeth to receive the second gear such that the second gear does not engage the first gear teeth, and wherein the inner rotatable sleeve has a second slot in the second gear teeth to receive the first gear such that the first gear does not engage the second gear teeth.

7. The valve of claim 3, wherein, when the actuator rotates the drive shaft in a first direction, the outer rotatable sleeve is rotated in the first direction and the inner rotatable sleeve is not rotated, and when the actuator rotates the drive shaft in a second direction opposite the first direction, the inner rotatable sleeve is rotated in the second direction and the outer rotatable sleeve is not rotated.

8. The valve of claim 1, wherein the first opening and the second opening have a same first shape, and the first plurality of openings and the second plurality of openings have a same second shape different than the first shape.

9. The valve of claim 8, wherein the first and second openings are larger than the first and second plurality of openings.

* * * * *